(12) United States Patent
Takeuchi et al.

(10) Patent No.: US 12,473,406 B2
(45) Date of Patent: Nov. 18, 2025

(54) EMULSIFICATION COMPOSITION CONTAINING HYDROPHOBIC-MODIFIED CELLULOSE FIBERS

(71) Applicant: KAO CORPORATION, Tokyo (JP)

(72) Inventors: Toshiaki Takeuchi, Wakayama (JP); Yoshinori Hasegawa, Wakayama (JP); Takuya Masuda, Wakayama (JP); Kouji Ohsaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 741 days.

(21) Appl. No.: 17/630,565

(22) PCT Filed: Jul. 31, 2020

(86) PCT No.: PCT/JP2020/029412
§ 371 (c)(1),
(2) Date: Jan. 27, 2022

(87) PCT Pub. No.: WO2021/024933
PCT Pub. Date: Feb. 11, 2021

(65) Prior Publication Data
US 2022/0259385 A1    Aug. 18, 2022

(30) Foreign Application Priority Data

Aug. 2, 2019  (JP) ................................. 2019-143212
Dec. 13, 2019  (JP) ................................. 2019-225605

(51) Int. Cl.
*C08J 3/05*      (2006.01)
*C08J 5/18*      (2006.01)
(Continued)

(52) U.S. Cl.
CPC . *C08J 3/05* (2013.01); *C08J 5/18* (2013.01); *C08J 7/0427* (2020.01); *C08L 1/02* (2013.01);
(Continued)

(58) Field of Classification Search
CPC .... C08J 3/05; C08J 5/18; C08J 7/0427; C08L 1/02; C09D 5/1637; C09D 101/02; A61K 8/06
See application file for complete search history.

(56) References Cited

U.S. PATENT DOCUMENTS

2020/0071491 A1    3/2020  Ohsaki et al.

FOREIGN PATENT DOCUMENTS

| JP | 2012126786 A | 7/2012 | |
| JP | 2015044168 A | * 3/2015 | ............. C09K 23/56 |

(Continued)

OTHER PUBLICATIONS

English Machine Translation of JP2015044168 (A ) obtained on Nov. 6, 2024 from https://worldwide.espacenet.com/publicationDetails/biblio?CC=JP&NR=2015044168A&KC=A&FT=D&ND=3&date=20150312&DB=&locale=en_EP (Year: 2015).*

(Continued)

*Primary Examiner* — Catherine S Branch
*Assistant Examiner* — Olga Lucia Donahue
(74) *Attorney, Agent, or Firm* — Element IP, PLC

(57) ABSTRACT

The present invention relates to the provision of an aqueous emulsion composition for producing a film showing slippery properties containing hydrophobically modified cellulose fibers and at the same time improving water resistance and durability of the film. Since the emulsion composition of the present invention is capable of forming a film having slippery properties, which can be utilized on various surfaces, for example, those in the fields of coatings for ships and bridges, cosmetics, and the like.

13 Claims, 1 Drawing Sheet

(51) Int. Cl.
   *C08J 7/04*     (2020.01)
   *C08L 1/02*     (2006.01)
   *C09D 5/16*     (2006.01)
   *C09D 101/02*   (2006.01)
(52) U.S. Cl.
   CPC ......... *C09D 5/1637* (2013.01); *C09D 101/02* (2013.01)

(56) References Cited

FOREIGN PATENT DOCUMENTS

| | | |
|---|---|---|
| JP | 2017014115 A | 1/2017 |
| JP | 2017014116 A | 1/2017 |
| JP | 2018044095 A | 3/2018 |
| WO | WO-2018164135 A1 | 9/2018 |
| WO | WO-2019062845 A1 | 4/2019 |

OTHER PUBLICATIONS

Extended European Search Report issued Jul. 10, 2023 in Patent Application No. 20849147.2, 6 pages.
Richard K. Johnson et al., "Preparation and characterization of hydrophobic derivatives of TEMPO-oxidized nanocelluloses", Cellulose, vol. 18, XP019974236, pp. 1599-1609.
International Search Report issued Oct. 13, 2020 in PCT/JP2020/029412, 2 pages.
Office Action issued Apr. 19, 2025, in corresponding Korean Patent Application No. 10-2022-7006000 (with machine English translation), 15 pages.

* cited by examiner

EMULSIFICATION COMPOSITION CONTAINING HYDROPHOBIC-MODIFIED CELLULOSE FIBERS

FIELD OF THE INVENTION

The present invention relates to an emulsion composition containing hydrophobically modified cellulose fibers.

BACKGROUND OF THE INVENTION

Conventionally, in the fields of package containers and the like for cosmetics, foods, and the like, surface films for inhibiting depositions of fluids such as subjects which can be contacted with a container, a tray or the like (for example, materials for subjects, such as cosmetics and foods, that are filled in a container or packaged with a film) and soils have been developed. Recently, a film comprising hydrophobically modified cellulose fibers and an oil has been known.

For example, Patent Publication 1 discloses a film comprising hydrophobically modified cellulose fibers in which cellulose fibers are bound to a modifying group at one or more members selected from anionic groups and hydroxyl groups, and an oil having an SP value of 10 or less.

On the other hand, as an emulsion composition, Patent Publication 2 describes that a viscous aqueous composition having not only excellent emulsion stability, but also excellent shape-retaining ability, dispersion stability, and salinity tolerance can be produced by binding fine anionically modified cellulose fibers to a monoamine having an organic property value of 300 or less.

Patent Publication 1: WO 2018/164135
Patent Publication 2: Japanese Patent Laid-Open No. 2012-126786

SUMMARY OF THE INVENTION

The present invention relates to the following [1] to [8]:
[1] An emulsion composition containing the following Components (A) to (C):
(A) one or more hydrophobically modified cellulose fibers selected from the group consisting of the following Component (a) and Component (b):
  (a) hydrophobically modified cellulose fibers in which cellulose fibers are bound to a silicone-based compound; and
  (b) hydrophobically modified cellulose fibers in which anionically modified cellulose fibers are bound at an anionic group thereof to a hydrocarbon-based compound having a cationic group having a total number of carbon atoms of 16 or more and 40 or less via ionic bonding; (B) water; and
(C) an organic compound that is liquid at 25° C. and 1 atm.
[2] The emulsion composition according to the above [1], further containing Component (D) a polyether-modified silicone compound.
[3] A method for producing an emulsion composition as defined in the above [1] or [2], including mixing:
Component (A-1) anionically modified cellulose fibers;
Component (A-2) one or more compounds selected from the group consisting of amino-modified silicones, and hydrocarbon-based compounds having a cationic group having a total number of carbon atoms of 16 or more and 40 or less;
Component (B) water; and
Component (C) an organic compound that is liquid at 25° C. and 1 atm.
[4] A method for producing a film containing hydrophobically modified cellulose fibers, including drying an emulsion composition as defined in the above [1] or [2].
[5] A dried film obtained by drying an emulsion composition as defined in the above [1] or [2].
[6] A coated film obtained by applying an emulsion composition as defined in the above [1] or [2], and then drying the emulsion composition.
[7] An inhibitor for depositions of organisms, an antifouling agent, or an inhibitor for depositions of snow, containing an emulsion composition as defined in the above [1] or [2].
[8] A film comprising a granular structure, containing
(A) one or more hydrophobically modified cellulose fibers selected from the group consisting of the following Component (a) and Component (b):
  (a) hydrophobically modified cellulose fibers in which cellulose fibers are bound to a silicone-based compound; and
  (b) hydrophobically modified cellulose fibers in which anionically modified cellulose fibers are bound at an anionic group thereof to a hydrocarbon-based compound having a cationic group having a total number of carbon atoms of 16 or more and 40 or less via ionic bonding; and
(C) an organic compound that is liquid at 25° C. and 1 atm.

DETAILED DESCRIPTION OF THE INVENTION

Figure 1:
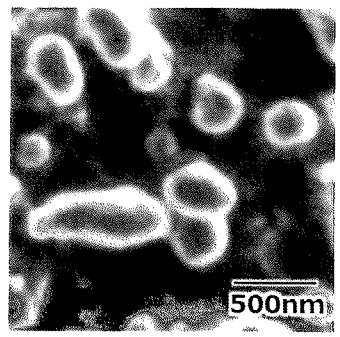
FIG. 1 is a photomicrograph (magnification: 25,000 folds) with Cryo-SEM of an emulsion composition produced in Example 1.

The film comprising a hydrophobically modified cellulose fibers and an oil described in Patent Publication 1 is produced by dispersing the hydrophobically modified cellulose fibers in a solvent, and evaporating the solvent from a state of dissolving the oil. The film shows certain slippery properties, but further durability is to be desired.

In addition, Patent Publication 2 is purposed for obtaining a viscous aqueous composition having excellent emulsion stability, not for forming a film.

Therefore, the present invention relates to the provision of an aqueous emulsion composition for producing a film having excellent water resistance or excellent slippery properties with durability, and a film.

By using an aqueous emulsion composition provided by the present invention, a film having excellent water resistance, or a film having slippery properties with excellent durability can be produced.

As a result of intensive studies, the present inventors have surprisingly found that a film having excellent water resistance or showing slippery properties with excellent durability can be produced by applying an emulsion composition containing hydrophobically modified cellulose fibers in which cellulose fibers are bound to a silicone-based compound or a specified hydrocarbon-based compound, water, and an organic compound that is liquid at 25° C. and 1 atm to a substrate, and drying the emulsion composition applied. The present invention has been perfected thereby.

Although the mechanisms for exhibiting the effects are not ascertained, it is assumed to be as follows. In the emulsion composition, the above hydrophobically modified cellulose fibers form a network in the organic compound that is liquid at 25° C. and 1 atm, and the network is crosslinked with drying to form a film.

1. Emulsion Composition

The emulsion composition of the present invention contains Components (A) to (C) mentioned below.

<Component (A)>

Component (A) is one or more hydrophobically modified cellulose fibers selected from the group consisting of the following (a) and (b):

(a) hydrophobically modified cellulose fibers in which cellulose fibers are bound to a silicone-based compound; and (b) hydrophobically modified cellulose fibers in which anionically modified cellulose fibers are ionically bonded at an anionic group thereof to a hydrocarbon-based compound having a cationic group having a total number of carbon atoms of 16 or more and 40 or less.

The hydrophobically modified cellulose fibers as used herein are those in which cellulose fibers are bound to a silicone-based compound, or those in which anionically modified cellulose fibers are bound at an anionic group thereof to a hydrocarbon-based compound having a cationic group having a total number of carbon atoms of 16 or more and 40 or less via ionic bonding.

[Cellulose I Crystal Structure and Crystallinity]

It is preferable that the hydrophobically modified cellulose fibers have a cellulose I crystal structure because natural celluloses are used as the raw materials thereof. The crystallinity of the hydrophobically modified cellulose fibers is preferably 10% or more, more preferably 15% or more, and even more preferably 20% or more, from the viewpoint of exhibiting the strength during film formation. In addition, the crystallinity is preferably 90% or less, more preferably 85% or less, even more preferably 80% or less, and even more preferably 75% or less, from the viewpoint of availability of the raw materials. The cellulose I crystallinity is measured in accordance with the method described in Examples set forth below.

[Average Fiber Diameter of Hydrophobically Modified Cellulose Fibers]

The average fiber diameter of the hydrophobically modified cellulose fibers is preferably 0.1 nm or more, more preferably 1.0 nm or more, and even more preferably 2.0 nm or more, from the viewpoint of handling property, and the average fiber diameter is preferably 200 nm or less, more preferably 100 nm or less, and even more preferably 50 nm or less, from the viewpoint of the strength during film formation. The average fiber diameter of the hydrophobically modified cellulose fibers is measured in accordance with the method described in Examples set forth below.

[Modifying Group]

One of the preferred embodiments of the hydrophobically modified cellulose fibers of Component (a), in other words, the hydrophobically modified cellulose fibers in which cellulose fibers are bound to a silicone-based compound comprises a structure represented by the following general formula (T-Ce):

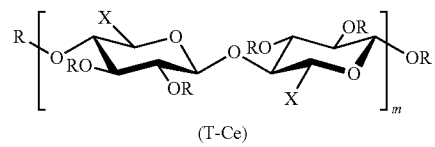

(T-Ce)

wherein X is one or more groups selected from the group consisting of —CH$_2$OH, —CH$_2$O—R$^1$, —C(=O)OH, —C(=O)O—R$^1$, —C(=O)—O$^-$H$_3$N$^+$—R$^1$ and —C(=O)—NH—R$^1$, wherein R$^1$ is a modifying group; each of R's is independently a hydrogen atom or a modifying group, wherein R$^1$ and R may be identical or different, and at least one of plural R$^1$'s and R's is a modifying group; and m is an integer of 20 or more and 3,000 or less.

The modifying group in the hydrophobically modified cellulose fibers in which cellulose fibers are bound to a silicone-based compound is a group derived from a silicone-based compound, and the structure of the modifying group (in other words, R$^1$ and R in the above formula (T-Ce)) depends upon the structure of the silicone-based compound used. It is preferable that the binding form of the modifying group to the cellulose fibers is covalent bonding or ionic bonding. The ionic bonding is preferred, from the viewpoint of convenience of the production, and the covalent bonding is preferred, from the viewpoint of stability of the film formed. The compounds for introducing a modifying group, such as a silicone-based compound, and a hydrocarbon-based compound having a cationic group having a total number of carbon atoms of 16 or more and 40 or less, may be described herein as "compounds for modification."

The binding site of the modifying group in the cellulose fibers includes a hydroxy group or an aldehyde group owned by the cellulose fibers, or a functional group introduced by chemically modifying the cellulose fibers. The functional group introduced by the above chemical modification is preferably an anionic group, and more preferably a carboxy group. The cellulose fibers are preferably anionically modified cellulose fibers, and more preferably carboxy group-containing cellulose fibers, from the viewpoint of easy preparation, and from the viewpoint of mild reaction conditions.

When the above binding site is a hydroxy group of the cellulose fibers, the binding form is covalent bonding, which includes ether bonding, ester bonding, carbonate bonding, and the like.

When the above binding site is an anionic group of the anionically modified cellulose fibers, the binding form is ionic bonding or covalent bonding. When the binding form is the ionic bonding, a compound for modification having a cationic group is in the state of binding via electrostatic interactions, and when the binding form is the covalent bonding, the compound is in a state of binding via an ester bonding, an amide bonding, or the like, and in particular a carboxy group of carboxy group-containing cellulose fibers is in the state of binding via an ester bonding, an amide bonding, a carbonate bonding, a urethane bonding, or the like.

For example, in a case where a compound for modification is an amino-modified silicone (denoted as "H$_2$N-[alkyl silicone backbone]"), and the cellulose fibers are carboxy group-containing cellulose fibers (denoted as "[cellulose backbone]-C*(=O)—OH"), when the binding form is ionic bonding, the hydrophobically modified cellulose fibers would have a structure of a "[cellulose backbone]-C*

(=O)—O⁻H₃N⁺-[alkyl silicone backbone]," and a modifying group would be "-[alkyl silicone backbone]." On the other hand, when the binding form is an amide bonding, the hydrophobically modified cellulose fibers would have a structure of a "[cellulose backbone]-C*(=O)—NH-[alkyl silicone backbone]," and a modifying group would be "-[alkyl silicone backbone]." As described above, the structure of the modifying group depends upon the structure of the compound for modification used. Here, "C*" means a carbon atom at position 6 of the cellulose constituting unit.

In addition, the modifying group of the hydrophobically modified cellulose fibers of Component (b), in other words, hydrophobically modified cellulose fibers in which anionically modified cellulose are bound at an anionic group thereof to a hydrocarbon-based compound having a cationic group having a total number of carbon atoms of 16 or more and 40 or less via ionic bonding, is derived from a hydrocarbon-based compound having a cationic group having a total number of carbon atoms of 16 or more and 40 or less. In this case, the binding form of the modifying group to the anionically modified cellulose fibers at an anionic group thereof is an ionic bonding, and the hydrophobically modified cellulose fibers of Component (b) are in the state that a cationic group owned by the modifying group is adsorbed to the anionic group of the surface of the cellulose fibers via electrostatic interactions.

The groups derived from the silicone-based compounds and the groups derived from the hydrocarbon-based compounds having a cationic group having a total number of carbon atoms of 16 or more and 40 or less will be hereinafter inclusively referred to as "modifying groups."

The binding amount, mmol/g, and the introduction ratio, % by mol, of the modifying group in the hydrophobically modified cellulose fibers are the amount and the proportion of the modifying group introduced to the hydrophobically modified cellulose fibers. Specifically, the binding amount and the introduction ratio are measured in accordance with the methods described in Examples set forth below. The binding amount and the introduction ratio of the modifying group can be adjusted by an amount and the kinds of a compound for modification, a reaction temperature, a reaction time, a solvent, or the like.

The binding amount of the modifying group in the hydrophobically modified cellulose fibers is preferably 0.1 mmol/g or more, more preferably 0.2 mmol/g or more, and even more preferably 0.5 mmol/g or more, from the viewpoint of obtaining a film having improved water resistance and slippery properties. In addition, the binding amount is preferably 3 mmol/g or less, more preferably 2.5 mmol/g or less, and even more preferably 2 mmol/g or less, from the viewpoint of the reactivities.

In addition, the introduction ratio of the modifying group in the hydrophobically modified cellulose fibers is preferably 10% by mol or more, more preferably 20% by mol or more, even more preferably 40% by mol or more, and even more preferably 50% by mol or more, from the viewpoint of obtaining a film having improved water resistance and slippery properties, and the introduction ratio is preferably 99% by mol or less, more preferably 97% by mol or less, even more preferably 95% by mol or less, and even more preferably 90% by mol or less, from the viewpoint of the reactivities.

[Method for Producing Hydrophobically Modified Cellulose Fibers]

The hydrophobically modified cellulose fibers of Component (A) include, for example, a method including the steps of (1) introducing an anionic group to the raw material cellulose fibers, to obtain anionically modified cellulose fibers, and (2) binding the anionically modified cellulose fibers with a silicone-based compound and/or a hydrocarbon-based compound having a cationic group having a total number of carbon atoms of 16 or more and 40 or less, to obtain hydrophobically modified cellulose fibers.

One embodiment of the step of the above (2) includes mixing

Component (A-1) anionically modified cellulose fibers;
Component (A-2) one or more compounds selected from the group consisting of amino-modified silicones, and hydrocarbon-based compounds having a cationic group having a total number of carbon atoms of 16 or more and 40 or less;
Component (B) water; and
Component (C) an organic compound that is liquid at 25° C. and 1 atm.

The above embodiment is identical to the steps in the method for producing an emulsion composition of the present invention described later, specifically, the step of mixing Component (A-1), Component (A-2), Component (B), and Component (C). According to the above embodiment, since the hydrophobically modified cellulose fibers and the emulsion composition of the present invention can be produced by the identical step, it can be said to be a more preferred method for production.

(1) Step of Obtaining Anionically Modified Cellulose Fibers

The anionically modified cellulose fibers usable in the present invention can be obtained by subjecting raw material cellulose fibers to an oxidation treatment or an addition treatment of an anionic group, to introduce at least one or more anionic groups thereby anionically modifying the cellulose fibers.

The cellulose fibers which are subject for the anionic modification, in other words, the raw material cellulose fibers for the hydrophobically modified cellulose fibers and the anionically modified cellulose fibers, are preferably natural cellulose fibers, from the environmental viewpoint. The natural cellulose fibers include, for example, those from wooden pulp such as pulp from needle-leaf trees and pulp from broad-leaf trees; cotton pulp from cotton linter and cotton lint; non-wooden pulp such as maize straw pulp and bagasse pulp; bacteria cellulose; and the like. These natural cellulose fibers can be used alone or in a combination of two or more kinds.

The average fiber diameter of the raw material cellulose fibers is, but not particularly limited to, preferably 1 μm or more, and preferably 300 μm or less, from the viewpoint of handling property and costs.

In addition, the average fiber length of the raw material cellulose fibers is, but not particularly limited to, preferably 100 μm or more, and preferably 5,000 μm or less, from the viewpoint of availability and costs. The average fiber diameter and the average fiber length of the raw material cellulose fibers can be measured in accordance with the methods described in Examples set forth below. It is preferable to use cellulose fibers in which raw material cellulose fibers are subjected to an alkali hydrolysis treatment, an acid hydrolysis treatment, or the like to treat for shortening fibers so as to have an average fiber length of 1 μm or more and 1,000 μm or less, from the viewpoint of the dispersibility.

The anionic group to be introduced includes a carboxy group, a sulfonate group, or a phosphate group.

(i) A Case where Cellulose Fibers are Introduced with a Carboxy Group as an Anionic Group The method for introducing a carboxy group to cellulose fibers includes, for example, a method of oxidizing a hydroxy group of cellulose to convert the hydroxy group to a carboxy group; and a method of treating a hydroxy group of cellulose with at least one member selected from the group consisting of compounds having a carboxy group, acid anhydrides of compounds having a carboxy group, and derivatives thereof.

The method of subjecting the above cellulose to an oxidization treatment at a hydroxy group is not particularly limited. For example, a method of subjecting to an oxidization treatment including treating the cellulose with an oxidizing agent such as sodium hypochlorite and a bromide such as sodium bromide using 2,2,6,6-tetramethyl-1-piperidine-N-oxyl (TEMPO) as a catalyst can be applied. More specifically, a reference can be made to a known method, for example, a method described in Japanese Patent Laid-Open No. 2011-140632.

By subjecting the cellulose fibers to an oxidization treatment using TEMPO as a catalyst, a hydroxymethyl group ($—CH_2OH$) at C6 position of the cellulose constituting unit is selectively converted to a carboxy group. In particular, this method is advantageous in the aspects that the selectivity of a hydroxy group at C6 position to be oxidized on the surface of the raw material cellulose fibers is excellent, and reaction conditions are mild. Therefore, a preferred embodiment of the anionically modified cellulose fibers in the present invention includes cellulose fibers in which C6 position of the cellulose constituting unit is a carboxy group. The cellulose fibers as used herein may be referred to as "oxidized cellulose fibers." The oxidized cellulose fibers are preferred because the preparation is easier as compared to those of other anionically modified cellulose fibers. Therefore, one of the preferred embodiments of the hydrophobically modified cellulose fibers in the present invention is hydrophobically modified cellulose fibers in which carboxy group-containing cellulose fibers are bound to an amino-modified silicone.

The oxidized cellulose fibers are further subjected to an additional oxidation treatment or a reduction treatment, whereby oxidized cellulose fibers in which the remaining aldehyde group is removed can be prepared.

(ii) A Case where Cellulose Fibers are Introduced with a Sulfonate Group or a Phosphate Group as an Anionic Group The method of introducing a sulfonate group as an anionic group to cellulose fibers includes a method of adding sulfuric acid to the cellulose fibers and heating, and the like.

The method of introducing a phosphate group as an anionic group to cellulose fibers includes a method of mixing cellulose fibers which are in a dry state or a wet state with a powder or an aqueous solution of phosphoric acid or a phosphoric acid derivative; a method of adding an aqueous solution of phosphoric acid or a phosphoric acid derivative to a dispersion of cellulose fibers; and the like. When these methods are employed, a dehydration treatment, a heating treatment and the like are generally carried out after mixing or adding a powder or an aqueous solution of phosphoric acid or a phosphoric acid derivative.

(iii) Anionically Modified Cellulose Fibers—Component (A-1)

The anionic group contained in the anionically modified cellulose fibers obtained as described above includes, for example, a carboxy group, a sulfonate group, a phosphate group, and the like. The above anionic group is preferably a carboxy group, from the viewpoint of the introduction efficiency of the modifying group to the cellulose fibers. The ions, counterions, constituting a pair with an anionic group in the anionically modified cellulose fibers include, for example, metal ions which are formed in the presence of an alkali during the production, such as sodium ions, potassium ions, calcium ions, and aluminum ions, and protons generated by substituting these metal ions with an acid, and the like.

The anionic group content in the anionically modified cellulose fibers is preferably 0.1 mmol/g or more, more preferably 0.4 mmol/g or more, even more preferably 0.6 mmol/g or more, and even more preferably 0.8 mmol/g or more, from the viewpoint of the introduction of a modifying group. In addition, the anionic group content is preferably 3 mmol/g or less, more preferably 2 mmol/g or less, and even more preferably 1.8 mmol/g or less, from the viewpoint of improving handling property. Here, the "anionic group content" means a total amount of anionic groups in the cellulose constituting the cellulose fibers, which is specifically measured in accordance with a method described in Examples set forth below.

The average fiber diameter of the anionically modified cellulose fibers is preferably 0.1 nm or more, more preferably 1.0 nm or more, and even more preferably 2.0 nm or more, from the viewpoint of handling property, and the average fiber diameter is preferably 200 nm or less, more preferably 100 nm or less, and even more preferably 50 nm or less, from the viewpoint of the strength during film formation. The average fiber diameter of the anionically modified cellulose fibers is measured in accordance with the method described in Examples set forth below.

(2) Step of Obtaining Hydrophobically Modified Cellulose Fibers

The hydrophobically modified cellulose fibers of Component (A) can be produced by binding the anionically modified cellulose fibers mentioned above with one or more compounds selected from the group consisting of amino-modified silicones, and hydrocarbon-based compounds having a cationic group having a total number of carbon atoms of 16 or more and 40 or less. As the method for production, a known method, for example, a method described in Japanese Patent Laid-Open No. 2015-143336 can be used.

(i) Silicone-Based Compound

As the silicone-based compound usable as the compound for modification in the present invention, a commercially available product can be used, or a silicone-based compound can be prepared in accordance with a known method. The silicone compounds may be used alone or in two or more kinds.

The silicone-based compound usable as the compound for modification in the present invention includes amino-modified silicones, epoxy-modified silicones, carboxy-modified silicones, carbinol-modified silicones, hydrogen-modified silicones, and the like. The position of the reactive group may be a side chain or a terminal of the silicone compound. Among them, the amino-modified silicone is preferred, from the viewpoint of easiness of modification.

(ii) Amino-Modified Silicone

The amino-modified silicone refers to a silicone-based compound having an amino group. The amino-modified silicone having a kinetic viscosity at 25° C. of 10 $mm^2/s$ or more and 20,000 $mm^2/s$ or less is preferred. Further, included are the amino-modified silicones having an amino equivalence of 400 g/mol or more and 16,000 g/mol or less as preferred ones.

The kinetic viscosity at 25° C. can be obtained with an Ostwald's viscometer, and the kinetic viscosity is more preferably 20 $mm^2/s$ or more, and even more preferably 50 $mm^2/s$ or more, from the viewpoint of the slippery properties, and the kinematic viscosity is more preferably 10,000 mm 2/s or less, and even more preferably 5,000 mm²/s or less, from the viewpoint of the handling property.

In addition, the amino equivalence is preferably 400 g/mol or more, more preferably 600 g/mol or more, and even more preferably 800 g/mol or more, from the viewpoint of the slippery properties, and the amino equivalence is preferably 16,000 g/mol or less, more preferably 14,000 g/mol or less, even more preferably 12,000 g/mol or less, from the viewpoint of easiness in binding to the anionically modified cellulose fibers. Here, the amino equivalence is a molecular weight per one nitrogen atom, which can be obtained by amino equivalence, g/mol=mass-average molecular weight/the number of nitrogen atoms per molecule.

Here, the mass-average molecular weight is a value obtained by gel permeation chromatography using polystyrenes as standard substances, and the number of nitrogen atoms can be obtained by elemental analysis method.

Specific examples of the amino-modified silicone include a compound represented by the general formula (a1):

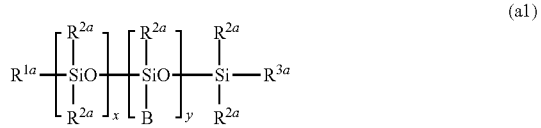

(a1)

wherein $R^{1a}$ is a group selected from an alkyl group having from 1 to 3 carbon atoms, a hydroxy group, an alkoxy group having from 1 to 3 carbon atoms, or a hydrogen atom, and from the viewpoint of the slippery properties, a methyl group or a hydroxy group is preferred; $R^{2a}$ is a group selected from an alkyl group having from 1 to 3 carbon atoms, a hydroxy group, or a hydrogen atom, and from the same viewpoint, a methyl group or a hydroxy group is preferred; B is a side chain having at least one amino group; $R^{3a}$ is an alkyl group having from 1 to 3 carbon atoms or a hydrogen atom; and each of x and y is an average degree of polymerization, which is selected so that the kinetic viscosity at 25° C. and the amino equivalence of the compound fall within the range as defined above; here, each of $R^{1a}$, $R^{2a}$, and $R^{3a}$ may be identical or different, or plural $R^{2a}$'s may be identical or different.

In the compound of the general formula (a1), from the viewpoint of the slippery properties, x is preferably the number of from 10 or more to 10,000 or less, more preferably the number of 20 or more and 5,000 or less, and even more preferably the number of 30 or more and 3,000 or less; and y is preferably the number of 1 or more and 1,000 or less, more preferably the number of 1 or more and 500 or less, and even more preferably the number of 1 or more and 200 or less. The mass-average molecular weight of the compound of the general formula (a1) is preferably 2,000 or more and 1,000,000 or less, more preferably 5,000 or more and 100,000 or less, and even more preferably 8,000 or more and 50,000 or less.

In the general formula (a1), the side chain B having an amino group or amino groups includes the following ones:
—$C_3H_6$—$NH_2$,
—$C_3H_6$—NH—$C_2H_4$—$NH_2$,
—$C_3H_6$—NH—[$C_2H_4$—NH]$_e$—$C_2H_4$—$NH_2$,
—$C_3H_6$—NH($CH_3$),
—$C_3H_6$—NH—$C_2H_4$—NH($CH_3$),
—$C_3H_6$—NH—[$C_2H_4$—NH]—$C_2H_4$—NH($CH_3$),
—$C_3H_6$—N($CH_3$)$_2$,
—$C_3H_6$—N($CH_3$)—$C_2H_4$—N($CH_3$)$_2$,
—$C_3H_6$—N($CH_3$)—[$C_2H_4$—N($CH_3$)]$_g$—$C_2H_4$—N($CH_3$)$_2$, and
—$C_3H_6$—NH-cyclo-$C_5H_{11}$,
wherein each of e, f, and g is the number of from 1 to 30.

The amino-modified silicone used in the present invention can be produced by, for example, heating a hydrolysate obtained by hydrolyzing an organoalkoxysilane represented by the general formula (a2):

$$H_2N(CH_2)_2NH(CH_2)_3Si(CH_3)(OCH_3)_2 \quad (a2)$$

with excess water, a dimethyl cyclopolysiloxane, and a basic catalyst such as sodium hydroxide at 80° to 110° C. to carry out an equilibrium reaction, and neutralizing the basic catalyst with an acid at a time point when a reaction mixture reaches a desired viscosity (see, Japanese Patent Laid-Open No. Sho-53-98499).

In addition, the amino-modified silicone is preferably one or more members selected from the group consisting of monoamino-modified silicones each having one amino group in one side chain B and diamino-modified silicones each having two amino groups in one side chain B, and more preferably one or more members selected from the group consisting of a compound in which a side chain B having an amino group is represented by —$C_3H_6$—$NH_2$ [hereinafter referred to as Component (a1-1)], and a compound in which a side chain B having an amino group is represented by —$C_3H_6$—NH—$C_2H_4$—$NH_2$ [hereinafter referred to as Component (a1-2)], from the viewpoint of obtaining a film having high water resistance.

The amino-modified silicone in the present invention is preferably ones manufactured by Momentive Performance Materials, Inc., TSF4703 (kinetic viscosity: 1,000, amino equivalence: 1,600) and TSF4708 (kinetic viscosity: 1,000, amino equivalence: 2,800); ones manufactured by Dow Corning-Toray Silicone Co., Ltd., SS-3551 (kinetic viscosity: 1,000, amino equivalence: 1,700), SF8457C (kinetic viscosity: 1,200, amino equivalence: 1,800), SF8417 (kinetic viscosity: 1,200, amino equivalence: 1,700), SF8452C (kinetic viscosity: 600, amino equivalence: 6,400), BY16-209 (kinetic viscosity: 500, amino equivalence: 1,800), BY16-892 (kinetic viscosity: 1,500, amino equivalence: 2,000), BY16-898 (kinetic viscosity: 2,000, amino equivalence: 2,900), FZ-3760 (kinetic viscosity: 220, amino equivalence: 1,600), BY16-213 (kinetic viscosity: 55, amino equivalence: 2,700); ones manufactured by Shin-Etsu Chemical Co., Ltd., KF-8002 (kinetic viscosity: 1,100, amino equivalence: 1,700), KF-8004 (kinetic viscosity: 800, amino equivalence: 1,500), KF-8005 (kinetic viscosity: 1,200, amino equivalence: 11,000), KF-867 (kinetic viscosity: 1,300, amino equivalence: 1,700), KF-864 (kinetic viscosity: 1,700, amino equivalence: 3,800), KF-859 (kinetic viscosity: 60, amino equivalence: 6,000), from the viewpoint of the performance. Within the parentheses ( ), the kinetic viscosity is a measured value at 25° C. (units: mm²/s), and the units for the amino equivalence are g/mol.

As the component (a1-1), BY16-213 (kinetic viscosity: 55, amino equivalence: 2,700), and BY16-853U (kinetic viscosity: 14, amino equivalence: 450) are more preferred.

As the component (a1-2), SF8417 (kinetic viscosity: 1,200, amino equivalence: 1,700), BY16-209 (kinetic viscosity: 500, amino equivalence: 1,800), FZ-3760 (kinetic viscosity: 220, amino equivalence: 1,600), SF8452C (kinetic viscosity: 600, amino equivalence: 6,400), KF-8002 (kinetic viscosity: 1,100, amino equivalence: 1,700), and SS-3551 (kinetic viscosity: 1,000, amino equivalence: 1,700) are more preferred.

Here, the silicone-based compound may have a substituent. The substituent includes, for example, alkoxy groups having from 1 to 6 carbon atoms, such as a methoxy group, an ethoxy group, a propoxy group, an isopropoxy group, a butoxy group, an isobutoxy group, a sec-butoxy group, a tert-butoxy group, a pentyloxy group, an isopentyloxy group, and a hexyloxy group; alkoxycarbonyl groups of which alkoxy group has from 1 to 6 carbon atoms, such as a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, a pentyloxycarbonyl group, and an isopentyloxycarbonyl group; halogen atoms such as a fluorine atom, a chlorine atom, a bromine atom, and an iodine atom; acyl groups having from 1 to 6 carbon atoms such as an acetyl group and a propionyl group; aralkyl groups; aralkyloxy groups; alkylamino groups having from 1 to 6 carbon atoms; and dialkylamino groups of which alkyl group has from 1 to 6 carbon atoms.

(iii) Hydrocarbon-Based Compound Having Cationic Group Having Total Number of Carbon Atoms of 16 or More The hydrocarbon-based compound having a cationic group having a total number of carbon atoms of 16 or more in the present invention refers to a compound in which one or more hydrocarbon groups are bound to a single cationic group. The total number of carbon atoms of the hydrocarbon-based compound having a cationic group is 16 or more, and even more preferably 18 or more, from the viewpoint of obtaining a film having high water resistance, and the total number of carbon atoms is preferably 40 or less, more preferably 30 or less, and even more preferably 26 or less, from the viewpoint of the handling property.

The hydrocarbon-based compound having a cationic group, when the cationic group is a primary amine, a secondary amine, a tertiary amine, a quaternary ammonium, a phosphonium, or the like, is a compound in which the hydrocarbon group is directly bonded to a nitrogen atom or a phosphorus atom via covalent bonding. When the cationic group is amidine, guanidine, or the like, the hydrocarbon-based compound is a compound of which cationic group is bound to at least one of a nitrogen atom or a carbon atom of the functional group via covalent bonding. When the cationic group is imidazolium, pyridium, imidazoline, or the like, the hydrocarbon-based compound is a compound of which cationic group is bound to at least one or more hydrocarbon groups at any of the positions of the ring structure via covalent bonding.

It is more preferable that the hydrocarbon-based compound having a cationic group does not contain an oxyalkylene group.

(Hydrocarbon Group)

The hydrocarbon group in the above hydrocarbon-based compound includes, for example, chained saturated hydrocarbon groups, chained unsaturated hydrocarbon groups, cyclic saturated hydrocarbon groups, and aromatic hydrocarbon groups. The number of carbon atoms of the hydrocarbon group is preferably 1 or more, more preferably 2 or more, and even more preferably 3 or more, from the viewpoint of availability, and the number of carbon atoms is preferably 40 or less, more preferably 30 or less, and even more preferably 24 or less, from the same viewpoint. Here, the number of carbon atoms of the hydrocarbon group means the number of carbon atoms in one hydrocarbon group, unless specified otherwise.

Specific examples of the chained saturated hydrocarbon group include, for example, a methyl group, an ethyl group, a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl, a docosyl group, an octacosanyl group, and the like.

Specific examples of the chained unsaturated hydrocarbon group include, for example, an ethenyl group, a propenyl group, a butenyl group, an isobutenyl group, an isoprenyl group, a pentenyl group, a hexenyl group, a heptenyl group, an octenyl group, a nonenyl group, a decenyl group, a dodecenyl group, a tridecenyl group, a tetradecenyl group, and an octadecenyl group.

Specific examples of the cyclic saturated hydrocarbon group include, for example, a cyclopropyl group, a cyclobutyl group, a cyclopentyl group, a cyclohexyl group, a cycloheptyl group, a cyclooctyl group, a cyclononyl group, a cyclodecyl group, a cyclododecyl group, a cyclotridecyl group, a cyclotetradecyl group, a cyclooctadecyl group, and the like.

The aromatic hydrocarbon groups are, for example, selected from the group consisting of aryl groups and aralkyl groups. As the aryl group and the aralkyl group, those groups in which the aromatic ring moiety is substituted or unsubstituted may be used.

The aryl group includes, for example, a phenyl group, a naphthyl group, an anthryl group, a phenanthryl group, a biphenyl group, a triphenyl group, a terphenyl group, and groups in which these groups are substituted with a substituent given later.

The aralkyl group includes, for example, a benzyl group, a phenethyl group, a phenylpropyl group, a phenylpentyl group, a phenylhexyl group, a phenylheptyl group, a phenyloctyl group, and groups in which an aromatic group of these groups is further substituted with a substituent.

In the above hydrocarbon-based compound, a part of hydrogen atoms may be further substituted. The substituent includes, for example, a fluorine atom, a chlorine atom, a bromine atom, an iodine atom, a hydroxy group, a methoxy group, an ethoxy group, a carboxy group, an aldehyde group, a ketone group, a thiol group, and the like.

The above hydrocarbon-based having a cationic group is preferably a hydrocarbon-based compound having an amino group (referred to herein as "hydrocarbon-based amine"), such as primary amines, secondary amines, tertiary amines, and quaternary ammonium. Specific examples of the hydrocarbon-based amine are preferably hexadecylamine, stearylamine, oleylamine, dioctylamine, didecylamine, didodecylamine, trihexylamine, trioctylamine, tetrabutylammonium salts, tetrahexylammonium salts, dimethyldioctylammonium salts, dimethyldidecylammonium salts, trimethylhexadecylammonium salts, and the like.

(3) Step of Finely Pulverizing Treatment

The cellulose is finely pulverized in any of the stages of the method for producing hydrophobically modified cellulose fibers, whereby the cellulose of a micrometer scale can be finely pulverized to a nanometer scale. By reducing the average fiber diameter to a nanometer size, the strength during film formation is improved, so that it is preferable that the step of finely pulverizing treatment is further carried out.

As an apparatus to be used in the finely pulverizing treatment, a known dispersing machine is suitably used. For example, a disintegrator, a beating machine, a low-pressure homogenizer, a high-pressure homogenizer, a grinder, a cutter mill, a ball-mill, a jet mill, a short shaft extruder, a twin-screw extruder, an ultrasonic agitator, a juice mixer for households, or the like can be used. In addition, the solid ingredient content of the reaction product fibers in the finely pulverizing treatment is preferably 50% by mass or less.

<Component (B)>

Component (B) in the present invention is water. Component (B) has the roles of a solvent during the production of hydrophobically modified cellulose fibers, and one of the constituents of the emulsion composition of the present invention.

<Component (C)>

Component (C) in the present invention is an organic compound that is liquid at 25° C. and 1 atm. Component (C) may be a solvent during the production of hydrophobically modified cellulose fibers.

The water solubility of the organic compound that is liquid at 25° C. and 1 atm is preferably 10 g or less, and more preferably 1 g or less, per 100 g of water at 25° C.

The molecular weight of Component (C) is preferably 100,000 or less, more preferably 50,000 or less, and even more preferably 10,000 or less, from the viewpoint of obtaining a film having improved water resistance and slippery properties, and the molecular weight is preferably 100 or more, and more preferably 200 or more, from the same viewpoint as above.

Specifically, Component (C) in the present invention includes oil agents, organic solvents, polymerizable monomers, prepolymers, and the like. Component (C) in the present invention is preferably an oil agent. From the viewpoint of obtaining a film having improved water resistance and slippery properties, the oil agent includes, for example, one or more members selected from the group consisting of alcohols, ester oils, hydrocarbon oils, silicone oils, ether oils, fats and oils, fluorine-containing inert liquids, and fatty acids, one or more members selected from the group consisting of ester oils, silicone oils, ether oils, fats and oils, and fluorine-containing inert liquids are preferred, one or more members selected from the group consisting of silicone oils, ester oils, and ether oils are more preferred, and silicone oils and/or ester oils are even more preferred.

The ester oil includes monoester oils, diester oils, and triester oils, and specific examples include aliphatic or aromatic monocarboxylate esters or dicarboxylate esters having from 2 to 18 carbon atoms, such as isopropyl myristate, octyldodecyl myristate, myristyl myristate, 2-hexyldecyl myristate, isopropyl palmitate, glycerol tri(2-ethylhexanoate), and glycerol triisostearate.

The silicone oil includes, for example, dimethyl polysiloxane, methyl polysiloxane, methylphenyl polysiloxane, octamethyl cyclotetrasiloxane, decamethyl cyclopentasiloxane, and the like.

The fats and oils include, for example, vegetable oils and animal oils, such as soybean oil, coconut oil, linseed oil, cottonseed oil, rapeseed oil, and castor oil, and the like.

In the compound of Component (C), the SP value is preferably 10 or less, more preferably 9.5 or less, even more preferably 9.0 or less, and still even more preferably 8.5 or less, from the viewpoint of obtaining a film having improved water resistance and slippery properties, and preferably 6.0 or more, and more preferably 6.5 or more, from the same viewpoint as above.

The SP value as used herein refers to a solubility parameter (unit: $(cal/cm^3)^{1/2}$), calculated by Fedors method, which is described, for example, in Referential Publication "SP Chi Kiso-Ouyo to Keisan Hoho (*SP Values Basics and Applications and Method of Calculation*)" (JOIHOKIKO CO., LTD., 2005); *Polymer Handbook Third Edition* (A Wiley-Interscience Publication, 1989), or the like.

The oil agent having an SP value of 10 or less usable in the present invention includes, for example, oleic acid (SP value: 9.2), D-limonene (SP value: 9.4), PEG400 (SP value: 9.4), dimethyl succinate (SP value: 9.9), neopentyl glycol dicaprate (SP value: 8.9), hexyl laurate (SP value: 8.6), isopropyl laurate (SP value: 8.5), isopropyl myristate (SP value: 8.5), isopropyl palmitate (SP value: 8.5), isopropyl oleate (SP value: 8.6), hexadecane (SP value: 8.0), olive oil (SP value: 9.3), jojoba oil (SP value: 8.6), squalane (SP value: 7.9), liquid paraffin (SP value: 7.9), fluorine-containing inert liquids (for example, Fluorinert FC-40 (manufactured by 3M, SP value: 6.1), Fluorinert FC-43 (manufactured by 3M, SP value: 6.1), Fluorinert FC-72 (manufactured by 3M, SP value: 6.1), Fluorinert FC-770 (manufactured by 3M, SP value: 6.1)), silicone oils (KF96-1cs (manufactured by Shin-Etsu Chemical Co., Ltd., SP value: 7.3), KF-96-10cs (manufactured by Shin-Etsu Chemical Co., Ltd., SP value: 7.3), KF-96-50cs (manufactured by Shin-Etsu Chemical Co., Ltd., SP value: 7.3), KF-96-100cs (manufactured by Shin-Etsu Chemical Co., Ltd., SP value: 7.3), KF-96-1000cs (manufactured by Shin-Etsu Chemical Co., Ltd., SP value: 7.3), KF-96H-10000cs (manufactured by Shin-Etsu Chemical Co., Ltd., SP value: 7.3), and the like), and the like.

<Component (D)>

The emulsion composition of the present invention may contain a polyether-modified silicone compound of Component (D). Since Component (D) is blended in the emulsion composition, a film having improved water resistance and slippery properties can be obtained, and further the durability of the film obtained can be improved. One example of Component (D) includes a compound having a methyl silicone chain as a main chain, and a side chain comprising a polyoxyethylene group, and specifically includes a compound represented by the following general formula:

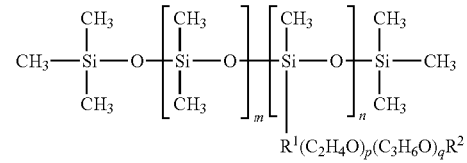

wherein $R^1$ is a methylene group, an ethylene group, or a trimethylene group; $R^2$ is an alkyl group having from 1 to 4 carbon atoms; m is an integer of from 0 to 50; n is an integer of from 1 to 10; p is an integer of from 1 to 50; and q is an integer of from 0 to 50, respectively; in the group represented by $—R^1(C_2H_4O)_p(C_3H_6O)_qR^2$, $(C_2H_4O)$, and $(C_3H_6O)_q$ may be random or block.

The HLB value of the polyether-modified silicone compound is preferably within a specified range, from the viewpoint of the durability of the film obtained by drying the emulsion composition, and specifically preferably 1 or more, more preferably 5 or more, and even more preferably 10 or more, and preferably 18 or less, and more preferably 16 or less.

When two or more kinds of the polyether-modified silicones having different HLB values are used, an HLB value obtained by a weighted average thereof may be within the range defined above. Here, the HLB value refers to an index showing a balance between hydrophilicity and lipophilicity, and in the present invention, the value refers to one calculated in accordance with the following Griffin formula:

HLB value=20×Total sum of molecular weights of hydrophilic group moieties/molecular weight The kinetic viscosity at 25° C. of the polyether-modified silicone compound is preferably within a specified range, from the viewpoint the durability of the film obtained by drying the emulsion composition, and specifically, the kinetic viscosity is preferably 1 mm$^2$/s or more, and more preferably 5 mm$^2$/s or more, and preferably 1000 mm$^2$/s or less, more preferably 500 mm$^2$/s or less, and even more preferably 200 mm$^2$/s or less.

The polyether-modified silicone compound that can be preferably used as Component (D) is commercially available, and commercially available products include those manufactured by Shin-Etsu Chemical Co., Ltd. such as "KF-615A," "KF-640," "KF-642," "KF-643," "KF-644," "KF-351A," "KF-354L," "KF-355A," "KF-6011," "KF-6012," "KF-6015," "KF-6016," "KF-6017," "KF-6020," "KF-6043," and the like, each being a trade name. "KF-640," "KF-642," "KF-643," "KF-351A," "KF-354L," "KF-355A" and the like can be preferably used, from the viewpoint the durability of the film obtained by drying the emulsion composition. Some commercially available products having a structure that does not fall under the above general formula (for example, those manufactured by Shin-Etsu Chemical Co., Ltd. such as "KF-6028" and "KF-6038," each being a trade name) can also be used as Component (D).

<Polymer Compound>

The emulsion composition of the present invention may further contain a polymer compound.

From the viewpoint of obtaining a film having high water resistance, the polymer compound is preferably one or more polymer compounds selected from the group consisting of the following Polymer compound (X) and Polymer compound (Y):

Polymer compound (X): polymer compounds having in its main chain an ester group, an amide group, an urethane group, an amino group, an ether group, or a carbonate group, provided that the polymer compounds that fall under any of Component (A-1) and Component (D) are not handled as polymer compounds (X); and Polymer compound (Y): methacrylic or acrylic polymers having in its side chain an ester group or an amide group, and the polymer compound (X) is more preferred.

The mass-average molecular weight of the above polymer compound is preferably 1,000 or more, from the viewpoint of obtaining a film having high water resistance, and the mass-average molecular weight is preferably 500,000 or less, from the same viewpoint.

[Polymer Compound (X)]

The polymer compound (X) having in its main chain an ester group includes condensates of dicarboxylic acids such as adipic acid, sebacic acid, dodecandionic acid, phthalic acid, isophthalic acid, terephthalic acid, succinic acid, and alkenylsuccinic acids, and diols such as ethylene glycol, propylene glycol, and butanediol, and the like, or condensates of a compound having both a hydroxy group and a carboxyl group in one molecule such as glycolic acid and lactic acid.

The polymer compound (X) having in its main chain an amide group includes condensates of dicarboxylic acids such as adipic acid, sebacic acid, dodecandionic acid, phthalic acid, isophthalic acid, terephthalic acid, succinic acid, and alkenylsuccinic acids, and diamine such as aliphatic diamines such as ethylenediamine, hexamethylenediamine, and propylenediamine, and the like.

The polymer compound (X) having in its main chain an urethane group includes polymerized products of diisocyanates such as tolyledine diisocyanate, diphenyl isocyanate, xylylene diisocyanate, and hexamethylene diisocyanate, and diols such as ethylene glycol, propylene glycol, and butanediol, and the like.

The polymer compound (X) having in its main chain an amino group includes polymerized products of alkylimines such as ethyleneimine, propyleneimine, butyleneimine, dimethylethyleneimine, pentyleneimine, and hexyleneimine, and the like.

The polymer compound (X) having in its main chain an ether group includes polymerized products of alkylene oxides such as ethylene oxide, propylene oxide, and butylene oxide; polymerized products of formaldehydes, and the like.

The polymer compound (X) having in its main chain a carbonate group includes condensates of polyols such as 2,2-bis(4-hydroxyphenyl)propane, 2,2-bis(4-hydroxyphenyl)butane, and 1,1-bis(4-hydroxyphenyl)cyclohexane, and phosgene, and the like.

[Polymer Compound (Y)]

The polymer compound (Y), specifically, a methacrylic or acrylic polymer having in its side chain an ester group or an amide group, includes, for example, polyalkyl (meth)acrylates, such as polymethyl (meth)acrylates, polyethyl (meth)acrylates, and polybutyl (meth)acrylates; poly(meth)acrylamides such as poly(meth)acrylamides, poly(N-methyl (meth)acrylamides), poly(N,N-dimethyl (meth)acrylamides), and poly(N-phenyl (meth)acrylamides), and the like.

<Other Components>

The emulsion composition of the present invention can contain, as other components besides those mentioned above, a plasticizer; a crystal nucleating agent; a filler including an inorganic filler and an organic filler; a hydrolysis inhibitor; a flame retardant; an antioxidant; a lubricant such as a hydrocarbon wax or an anionic surfactant; an ultraviolet absorbent; an antistatic agent; an anti-clouding agent; a photostabilizer; a pigment; a mildewproof agent; a bactericidal agent; a blowing agent; a surfactant; a polysaccharide such as starch or alginic acid; a natural protein such as gelatin, glue, or casein; an inorganic compound such as tannin, zeolite, ceramics, or a metal powder; a perfume; a fluidity modulator; a leveling agent; an electroconductive agent; an ultraviolet dispersant; a deodorant; or the like, within the range that would not impair the effects of the present invention. In addition, similarly, other polymeric materials and other compositions can be added within the range that would not impair the effects of the present invention.

<Properties of Emulsion Composition>

The emulsion composition of the present invention is a composition in an emulsion state, containing, as essential components, Component (A), Component (B), and Component (C) mentioned above. The emulsion or emulsification in the present invention refers to a state in which a mechanical force is applied in a state of mixing water and an organic compound that is liquid at 25° C. and 1 atm, to provide a state in which in one liquid the other liquid droplets are finely dispersed. Either an o/w type emulsion or a w/o type emulsion may be used, and the o/w type emulsion is preferred.

The content of Component (A) in the emulsion composition or during mixing is preferably 0.02% by mass or more, more preferably 0.05% by mass or more, and even more preferably 0.1% by mass or more, from the viewpoint of emulsifying force, and on the other hand, the content is preferably 15% by mass or less, more preferably 10% by mass or less, and even more preferably 5% by mass or less, from the viewpoint of handling property.

The content of Component (B) in the emulsion composition or during mixing is preferably 10% by mass or more, more preferably 20% by mass or more, and even more preferably 30% by mass or more, from the viewpoint of maintaining the emulsion state, and the content is preferably 98% by mass or less, from the viewpoint of the active ingredient content.

The content of Component (C) in the emulsion composition or during mixing is preferably 0.1% by mass or more, more preferably 0.5% by mass or more, and even more preferably 1% by mass or more, from the viewpoint of maintaining the emulsion state, and on the other hand, the content is preferably 70% by mass or less, more preferably 60% by mass or less, and even more preferably 50% by mass or less, from the viewpoint of solution viscosity and handling property.

The mass ratio of Component (A) to Component (C) (A/C) in the emulsion composition or during mixing is preferably 0.0001 or more, more preferably 0.001 or more, even more preferably 0.004 or more, even more preferably 0.01 or more, and even more preferably 0.04 or more, from the viewpoint of obtaining the film having improved water resistance and slippery properties, and the mass ratio is preferably 20 or less, more preferably 10 or less, even more preferably 5 or less, even more preferably 3 or less, and even more preferably 2 or less, from the viewpoint of film-forming property. From these viewpoints, the mass ratio is preferably 0.0001 or more and 20 or less, more preferably 0.001 or more and 10 or less, even more preferably 0.004 or more and 5 or less, even more preferably 0.01 or more and 3 or less, and even more preferably 0.04 or more and 2 or less.

When Component (D) is used, the content of Component (D) in the emulsion composition or during mixing is preferably 0.01% by mass or more, more preferably 0.05% by mass or more, and even more preferably 0.1% by mass or more, from the viewpoint of the durability of the film, and on the other hand, the content is preferably 5% by mass or less, more preferably 2% by mass or less, and even more preferably 1% by mass or less, from the viewpoint of inhibiting the increase in the viscosities of the composition.

When the emulsion composition of the present invention contains a polymer compound mentioned above, the content of the polymer compound in the emulsion composition is preferably 0.1% by mass or more, and more preferably 0.5% by mass or more, from the viewpoint of the durability of the film, and on the other hand, the content is preferably 20% by mass or less, more preferably 10% by mass or less, and even more preferably 5% by mass or less, from the viewpoint of inhibiting the increase in the viscosities of the composition.

Although the viscosity of the emulsion composition is not particularly limited, the viscosity at 25° C. is preferably 0.5 mPa·s or more, more preferably 0.8 mPa·s or more, and even more preferably 1 mPa·s or more, from the viewpoint of handling property, and the viscosity is preferably 30 Pa·s or less, more preferably 20 Pa·s or less, and even more preferably 10 Pa·s or less, from the same viewpoint. The viscosity as used herein is a value that is measured after one minute stirring under the conditions of 25° C. and a rotational speed of 60 rpm with an appropriate rotor matching the viscosity region of each sample with a B type viscometer.

The average particle diameter of the emulsion droplets in the emulsion composition, in the measurement in accordance with the SEM observations described later, is preferably 10 nm or more, more preferably 50 nm or more, and even more preferably 100 nm or more, from the viewpoint of improving water resistance and slippery properties, and the durability thereof, and the average particle diameter is preferably 2000 nm or less, more preferably 1000 nm or less, even more preferably 700 nm or less, and even more preferably 500 nm or less, from the same viewpoint. The average particle diameter is preferably 10 nm or more and 2000 nm or less, more preferably 50 nm or more and 1000 nm or less, and even more preferably 100 nm or more and 500 nm or less.

2. Method for Producing Emulsion Composition

The method for producing an emulsion composition of the present invention comprises mixing Component (A), Component (B), Component (C), and the like mentioned above. Here, an aqueous dispersion of hydrophobically modified cellulose fibers may be mixed with an organic compound that is liquid at 25° C. and 1 atm, or an organic compound dispersion of hydrophobically modified cellulose fibers may be mixed with water.

Alternatively, the method for producing an emulsion composition of the present invention includes a method for production including mixing Component (A-1), Component (A-2), Component (B), and Component (C). In the case of the above method, it is more preferred because the step of obtaining hydrophobically modified cellulose fibers and the step of obtaining an emulsion composition can be accomplished in a single step. The order of mixing in the above method is not limited. For example, Component (A-1), Component (A-2), and Component (B) may be mixed, and the mixture is then mixed with Component (C), or alternatively Component (A-1), Component (A-2), and Component (C) may be mixed, and the mixture is then mixed with Component (B).

Preferably, the method for production including mixing Component (A-1) and Component (A-2) in the presence of Component (B) and Component (C) is preferred.

Therefore, one preferred embodiment of the emulsion composition of the present invention contains Component (A-1), Component (A-2), Component (B), and Component (C). In that case, the content of Component (A) is a total content of Component (A-1) and Component (A-2).

When Component (D) is blended, Component (D) may be mixed together with these raw materials, or Component (D) may be added to an emulsion composition obtained from these raw materials.

By mixing each of the components, the emulsification is caused, thereby obtaining an emulsion composition. In the mixing treatment, a magnetic stirrer, a mechanical stirrer, a homomixer, a vacuum emulsification apparatus, a low-pressure homogenizer, a high-pressure homogenizer, a grinder, a cutter-mill, a ball-mill, a jet mill, a short shaft extruder, a twin-screw extruder, an ultrasonic agitator, a juice mixer for households, or the like can be used. The mixing treatment may be carried out by combining two or more kinds of operations.

The temperature and the time during mixing of each of the components are not particularly limited, and the temperature and the time are, for example, a temperature range of preferably from 5° to 50° C., and a range of preferably from 1 minute to 3 hours.

The preferred range of the content of each component during mixing is the same as the preferred range of the content of each component in the emulsion composition of the present invention mentioned above.

When Component (A-1) and Component (A-2) are used in place of Component (A), it is preferable that the upper limit and the lower limit of the preferred contents of Component (A) are the upper limit and the lower limit of a total amount of both the components. Here, the blending ratio of Component (A-1) to Component (A-2) is such that Component (A-2), based on the anionic groups of Component (A-1), is preferably 0.1 equivalents or more, more preferably 0.3 equivalents or more, and even more preferably 0.5 equivalents or more, from the viewpoint of the slippery properties and the durability thereof, and Component (A-2) is preferably 3 equivalents or less, more preferably 2 equivalents or less, and even more preferably 1.5 equivalents or less, from the viewpoint of stability of the emulsion composition.

Alternatively, the ratio of [a total number of moles of [the number of moles of amino groups of the amino-modified silicone] and [the number of moles of the hydrocarbon-based compound having a cationic group having a total number of carbon atoms of 16 or more and 40 or less] of Component (A-2)] to [the number of moles of anionic groups of Component (A-1)], i.e. [a total number of moles of Component (A-2)]/[number of moles of anionic groups of Component (A-1)]), is preferably 0.1 or more, more preferably 0.3 or more, and even more preferably 0.5 or more, from the viewpoint of obtaining the film having improved water resistance and slippery properties, and the durability thereof, and the ratio is preferably 3 or less, more preferably 2 or less, and even more preferably 1.5 or less, from the viewpoint of the film-forming property. The number of moles of the anionic groups of the anionically modified cellulose fibers may be obtained by multiplying the amount of the anionically modified cellulose fibers used, g, with the anionic group content, mmol/g, and the number of moles of amino groups in the amino-modified silicone may be obtained by dividing the amount of the amino-modified silicone used, g, by the amino equivalence, g/mol.

In addition, the mass ratio of Component (A-2) to Component (C) (A-2/C) is preferably 0.0001 or more, more preferably 0.001 or more, even more preferably 0.004 or more, even more preferably 0.01 or more, and even more preferably 0.04 or more, from the viewpoint of obtaining the film having improved water resistance and slippery properties, and the durability thereof, and the mass ratio is preferably 20 or less, more preferably 10 or less, even more preferably 5 or less, even more preferably 3 or less, and even more preferably 2 or less, from the viewpoint of the film-forming property. From these viewpoints, the mass ratio is preferably 0.0001 or more and 20 or less, more preferably 0.001 or more and 10 or less, even more preferably 0.004 or more and 5 or less, even more preferably 0.01 or more and 3 or less, even more preferably 0.04 or more and 2 or less.

3. Method for Producing Film Containing Hydrophobically Modified Cellulose Fibers The method for producing a film containing hydrophobically modified cellulose fibers of the present invention includes drying an emulsion composition of the present invention mentioned above, or an emulsion composition obtained by the method for producing an emulsion composition of the present invention.

Specifically, the above emulsion composition is applied to a substrate, for example, a solid surface made of glass, a resin, a metal, a ceramic, a cement concrete, wood, stone, fibers, or the like, or skin, hair, or the like. The method for coating includes, for example, a method of coating with an applicator, a bar-coater, a spin-coater, or the like, or paint-brush painting, hand painting, spraying, dip-coating, or the like, without being limited thereto.

The thickness of the coating film of the emulsion composition on a substrate is preferably 10 µm or more, more preferably 20 µm or more, and even more preferably 30 µm or more, from the viewpoint of the durability of the film, and the thickness is preferably 2000 µm or less, and more preferably 1500 µm or less, from the viewpoint of coatability.

Next, the coating film of the emulsion composition is dried, so that a coated film can be obtained. As the drying conditions, drying may be carried out under a reduced pressure or an ambient pressure, and the temperature range is preferably 15° C. or higher and 75° C. or lower. In addition, the time for drying is preferably 1 hour or more and 24 hours or less.

4. Dried Film of Emulsion Composition

It is preferable that the dried film of the emulsion composition of the present invention obtained by the method for production described above shows slippery surface properties shown in a publication (*Chouhassui Chouhatsuu Katsueki-sei Hyomen-no Gijutsu* (*Technologies of Super-Water-Repellent, Super Oil-Repellent Slippery Surfaces*); published by H. MOTOKI, publisher: Science & Technology K.K.; published on Jan. 28, 2016).

The slippery surface property can be measured, for example, in accordance with a method described in "Test for Measurement of Sliding Angle" of Examples set forth below. The smaller the values of sliding angle, the higher the slippery properties of the film.

The film of the present invention has further improved durability of the film by including a polyether-modified silicone compound mentioned above.

The thickness of the film of the present invention is, but not particular to, preferably 1 µm or more, more preferably 3 µm or more, and even more preferably 5 µm or more, from the viewpoint of durability of the film, and the thickness is preferably 2000 µm or less, more preferably 1200 µm or less, even more preferably 500 µm or less, and even more preferably 200 µm or less, from the viewpoint of economic advantages. Here, the thickness of the film can be provided to have a desired value by setting a coating thickness of a coating tool such as an applicator, or adjusting a proportion of a solvent. Here, the thickness of the film can be measured in accordance with the method described in Examples set forth below.

The higher the smoothness of the film of the present invention, the more preferred because the slippery properties become high. Specifically, the arithmetic mean roughness of the film immediately after the production is preferably 0.3 µm or more, more preferably 0.5 µm or more, and even more preferably 0.8 µm or more, from the viewpoint of costs versus effects, and on the other hand, the arithmetic mean roughness is preferably 40 µm or less, more preferably 35 µm or less, and even more preferably 30 µm or less, from the viewpoint of the deposition inhibiting property. Here, the arithmetic mean roughness of the film can be measured in accordance with a method described in Examples set forth below.

The higher the durability of the film of the present invention, the more preferred. The evaluation of the durability of the film can be evaluated by, for example, a degree of an increase in the arithmetic mean roughness of the film after allowing the film to contact water for a certain period of time or the presence or absence of the slippery properties. Specifically, when the arithmetic mean roughness of the film after 5 minutes from dropping in accordance with a test method defined in "Durability Test of Slippery Properties" in Examples set forth below is twice or less of the roughness before dropping, and the film after 5 minutes from dropping retains slippery properties, the film can be evaluated to have high durability.

The amount of the hydrophobically modified cellulose fibers in the film of the present invention is preferably 1% by mass or more, and more preferably 10% or more, from the viewpoint of durability of the film, and the amount is preferably 65% by mass or less, more preferably 36% by mass or less, and even more preferably 16% by mass or less, from the viewpoint of the slippery properties of the film. The amount of the hydrophobically modified cellulose fibers in the film can be obtained in considerations of the amounts of volatile components (for example, water and a part of oil agents) in the emulsion composition.

The preferred ranges of the amounts of Component (C) and Component (D) in the film of the present invention also correspond to the preferred ranges of the amounts thereof in the emulsion composition.

The film of the present invention may contain an optional component that does not impair the effects of the present invention. The contents of these optional contents in the film are preferably 0.1% by mass or more, more preferably 0.2% by mass or more, and even more preferably 0.5% by mass or more, and preferably 20% by mass or less, more preferably 15% by mass or less, and even more preferably 10% by mass or less.

The solid surface can be modified to a slippery surface by applying the film of the present invention to the solid surface. The film of the present invention has not only excellent slippery properties, but also excellent durability of the film itself, so that the effects thereof can be maintained for a long period of time. Therefore, the film can be suitably used in various applications, for example, packaging for daily sundries, cosmetics, household electrical appliances, and the like, interior materials for packaging containers such as blister packs, trays, and lids of lunch boxes, food containers, and further industrial trays and transportation pipes used in transportation or protections of industrial parts; coating materials for roofs, wall surfaces of construction buildings, ship-bottoms, electric wires, and the like. By the application thereof, the film can be suitably used as anti-fouling films for inhibiting depositions of powder dusts or the like, snow deposition inhibition films for inhibiting the depositions of snow, ice or the like, organism deposition inhibition films for inhibiting depositions of aquatic organisms, and the like.

The emulsion composition of the present invention is useful as an inhibitor for depositions of organisms, an anti-fouling agent, or an inhibitor for depositions of snow. By applying an emulsion composition of the present invention to a solid surface such as those mentioned above, the emulsion composition can be used for a method for inhibiting depositions of organisms, a method for soil protection, or a method for inhibiting depositions of snow.

The film of the present invention can be obtained by drying an emulsion composition of the present invention mentioned above, and the film is, for example, a film comprising a granular structure, containing:

(A) one or more hydrophobically modified cellulose fibers selected from the group consisting of the following Component (a) and Component (b):
  (a) hydrophobically modified cellulose fibers in which cellulose fibers are bound to a silicone-based compound; and
  (b) hydrophobically modified cellulose fibers in which anionically modified cellulose fibers are bound at an anionic group thereof to a hydrocarbon-based compound having a cationic group having a total number of carbon atoms of 16 or more and 40 or less via ionic bonding; and (C) an organic compound that is liquid at 25° C. and 1 atm.

When water of the emulsion composition is removed by drying, it is considered that cellulose fibers in which emulsion particles are formed form a networked granular structure. In addition, it is assumed that the durability is improved by including at least a part of Component (C) in the granular structure.

The maximum length of the particles in accordance with the observation with SEM is preferably from 10 to 2000 nm, and more preferably from 50 to 1000 nm, from the viewpoint of improving water resistance and slippery properties and the durability thereof. The maximum length means the maximum length out of length, width, and height when it is supposed that the particles are housed in a smallest rectangular parallelepiped. Here, the preferred numerical ranges and embodiments for each of the constituents of the film are the same as the preferred numerical ranges and embodiments for the emulsion composition mentioned above.

With respect to the above-mentioned embodiments, the present invention further discloses emulsion compositions, methods for producing an emulsion composition, methods for producing a film, dried films, coated films, inhibitors for depositions of organisms, anti-fouling agents, inhibitors for depositions of snow, and films given below.

<1> An emulsion composition containing the following Components (A) to (C):
(A) one or more hydrophobically modified cellulose fibers selected from the group consisting of the following Component (a) and Component (b):
  (a) hydrophobically modified cellulose fibers in which cellulose fibers are bound to a silicone-based compound; and
  (b) hydrophobically modified cellulose fibers in which anionically modified cellulose fibers are bound at an anionic group thereof to a hydrocarbon-based compound having a cationic group having a total number of carbon atoms of 16 or more and 40 or less via ionic bonding;
(B) water; and
(C) an organic compound that is liquid at 25° C. and 1 atm.

<2> The emulsion composition according to <1>, wherein the hydrophobically modified cellulose fibers preferably have a cellulose I crystal structure, and wherein the crystallinity of the hydrophobically modified cellulose fibers is preferably 10% or more and 90% or less, more preferably 15% or more and 85% or less, even more preferably 20% or more and 80% or less, and even more preferably 20% or more and 75% or less.

<3> The emulsion composition according to <1> or <2>, wherein the average fiber diameter of the hydrophobically modified cellulose fibers is preferably 0.1 nm or more and 200 nm or less, more preferably 1.0 nm or more and 100 nm or less, and even more preferably 2.0 nm or more and 50 nm or less.

<4> The emulsion composition according to any one of the above <1> to <3>, wherein the anionic group content in the anionically modified cellulose fibers is preferably 0.1 mmol/g or more and 3 mmol/g or less, more preferably 0.4 mmol/g or more and 2 mmol/g or less, even more preferably 0.6 mmol/g or more and 1.8 mmol/g or less, and even more preferably 0.8 mmol/g or more and 1.8 mmol/g or less.

<5> The emulsion composition according to any one of the above <1> to <4>, wherein the average fiber diameter of the anionically modified cellulose fibers is preferably 0.1 nm or more and 200 nm or less, more preferably 1.0 nm or more and 100 nm or less, and even more preferably 2.0 nm or more and 50 nm or less.

<6> The emulsion composition according to any one of the above <1> to <5>, wherein the water solubility of Component (C), per 100 g of water at 25° C., is preferably 10 g or less, and more preferably 1 g or less.

<7> The emulsion composition according to any one of the above <1> to <6>, wherein the molecular weight of Component (C) is preferably 100 or more and 100,000 or less, more preferably 200 or more and 50,000 or less, and even more preferably 200 or more and 10,000 or less.

<8> The emulsion composition according to any one of the above <1> to <7>, wherein Component (C) contains one or more members selected from the group consisting of oil agents, organic solvents, polymerizable monomers, and prepolymers.

<9> The emulsion composition according to any one of the above <1> to <8>, wherein Component (C) contains an oil agent, and Component (C) is preferably an oil agent, wherein the oil agent is preferably one or more members selected from the group consisting of alcohols, ester oils, hydrocarbon oils, silicone oils, ether oils, fats and oils, fluorine-containing inert liquids, and fatty acids, more preferably one or more members selected from the group consisting of ester oils, silicone oils, ether oils, fats and oils, and fluorine-containing inert liquids, even more preferably one or more members selected from the group consisting of silicone oils, ester oils, and ether oils, and even more preferably silicone oils and/or ester oils.

<10> The emulsion composition according to any one of the above <1> to <9>, wherein the SP value of Component (C) is preferably 6.0 or more and 10 or less, more preferably 6.5 or more and 9.5 or less, even more preferably 6.5 or more and 9.0 or less, and even more preferably 6.5 or more and 8.5 or less.

<11> The emulsion composition according to any one of the above <1> to <10>, wherein the silicone-based compound in Component (a) is preferably an amino-modified silicone, an epoxy-modified silicone, a carboxy-modified silicones, a carbinol-modified silicone, or a hydrogen-modified silicone, and more preferably an amino-modified silicone.

<12> The emulsion composition according to any one of the above <1> to <11>, wherein a total number of carbon atoms of the hydrocarbon-based compound having a cationic group in Component (b) is preferably 16 or more and 40 or less, more preferably 18 or more and 40 or less, even more preferably 18 or more and 30 or less, and even more preferably 18 or more and 26 or less.

<13> The emulsion composition according to any one of the above <1> to <12>, wherein the hydrocarbon-based compound having a cationic group in Component (b) is preferably a primary amine, a secondary amine, a tertiary amine, and a quaternary ammonium.

<14> The emulsion composition according to any one of the above <1> to <13>, wherein the content of Component (A) in the emulsion composition or during mixing is preferably 0.02% by mass or more and 15% by mass or less, more preferably 0.05% by mass or more and 10% by mass or less, and even more preferably 0.1% by mass or more and 5% by mass or less.

<15> The emulsion composition according to any one of the above <1> to <14>, wherein the content of Component (B) in the emulsion composition or during mixing is preferably 10% by mass or more and 98% by mass or less, more preferably 20% by mass or more and 98% by mass or less, and even more preferably 30% by mass or more and 98% by mass or less.

<16> The emulsion composition according to any one of the above <1> to <15>, wherein the content of Component (C) in the emulsion composition or during mixing is preferably 0.1% by mass or more and 70% or less, more preferably 0.5% by mass or more and 60% by mass or less, and even more preferably 1% by mass or more and 50% by mass or less.

<17> The emulsion composition according to any one of the above <1> to <16>, wherein a mass ratio of Component (A) to Component (C) (A/C) is preferably 0.0001 or more and 20 or less, more preferably 0.001 or more and 10 or less, even more preferably 0.004 or more and 5 or less, even more preferably 0.01 or more and 3 or less, and even more preferably 0.04 or more and 2 or less.

<18> The emulsion composition according to any one of the above <1> to <17>, further containing Component (D) a polyether-modified silicone compound, wherein the content of Component (D) is preferably 0.01% by mass or more and 5% by mass or less, more preferably 0.05% by mass or more and 2% by mass or less, and even more preferably 0.1% by mass or more and 1% by mass or less.

<19> The emulsion composition according to any one of the above <1> to <18>, wherein each of the contents of Component (A) to Component (D) in the emulsion composition or during mixing is preferably 0.02% by mass or more and 15% by mass or less, preferably 10% by mass or more and 98% by mass or less, preferably 0.1% by mass or more and 70% by mass or less, and preferably 0.01% by mass or more and 5% by mass or less.

<20> The emulsion composition according to any one of the above <1> to <19>, wherein the viscosity at 25° C. of the emulsion composition is preferably 0.5 mPa·s or more and 30 Pa·s or less, more preferably 0.8 mPa·s or more and 20 Pa·s or less, and even more preferably 1 mPa·s or more and 10 Pa·s or less.

<21> The emulsion composition according to any one of the above <1> to <20>, wherein the average particle diameter of the emulsion droplets in the emulsion composition is preferably 10 nm or more and 2000 nm or less, more preferably 50 nm or more and 1000 nm or less, even more preferably 100 nm or more and 700 nm or less, and even more preferably 100 nm or more and 500 nm or less.

<22> The emulsion composition according to any one of the above <1> to <21>, which contains Component (A-1) anionically modified cellulose fibers;

Component (A-2) one or more compounds selected from the group consisting of amino-modified silicones, and hydrocarbon-based compounds having a cationic group having a total number of carbon atoms of 16 or more and 40 or less;

Component (B) water; and

Component (C) an organic compound that is liquid at 25° C. and 1 atm.

<23> The emulsion composition according to the above <22>, wherein Component (A-2), based on the anionic groups of Component (A-1), is preferably 0.1 equivalents or more and 3 equivalents or less, more preferably 0.3 equivalents or more and 2 equivalents or less, and even more preferably 0.5 equivalents or more and 1.5 equivalents or less.

<24> The emulsion composition according to any one of the above <22> or <23>, wherein [(a total number of moles of Component (A-2)]/[a number of moles of anionic groups of Component (A-1)]) is preferably 0.1 or more and 3 or less, more preferably 0.3 or more and 2 or less, and even more preferably 0.5 or more and 1.5 or less.

<25> The emulsion composition according to any one of the above <22> to <24>, wherein a mass ratio (A-2/C) is preferably 0.0001 or more and 20 or less, more preferably 0.001 or more and 10 or less, even more preferably 0.004 or more and 5 or less, even more preferably 0.01 or more and 3 or less, and even more preferably 0.04 or more and 2 or less.

<26> A method for producing an emulsion composition as defined in any one of the above <1> to <25>, including mixing Component (A-1) anionically modified cellulose fibers;

Component (A-2) one or more compounds selected from the group consisting of amino-modified silicones, and hydrocarbon-based compounds having a cationic group having a total number of carbon atoms of 16 or more and 40 or less;

Component (B) water; and

Component (C) an organic compound that is liquid at 25° C. and 1 atm.

<27> The method for producing an emulsion composition according to the above <26>, wherein Component (A-2), based on the anionic groups of Component (A-1), is preferably 0.1 equivalents or more and 3 equivalents or less, more preferably 0.3 equivalents or more and 2 equivalents or less, and even more preferably 0.5 equivalents or more and 1.5 equivalents or less.

<28> The method for producing an emulsion composition according to the above <26> or <27>, wherein ([a total number of moles of Component (A-2)]/[a number of moles of anionic groups of Component (A-1)]) is preferably 0.1 or more and 3 or less, more preferably 0.3 or more and 2 or less, and even more preferably 0.5 or more and 1.5 or less.

<29> The method for producing an emulsion composition according to any one of the above <26> to <28>, wherein a mass ratio (A-2/C) is preferably 0.0001 or more and 20 or less, more preferably 0.001 or more and 10 or less, even more preferably 0.004 or more and 5 or less, even more preferably 0.01 or more and 3 or less, and even more preferably 0.04 or more and 2 or less.

<30> A method for producing a film containing hydrophobically modified cellulose fibers, including drying an emulsion composition as defined in any one of the above <1> to <25>.

<31> A dried film obtained by drying an emulsion composition as defined in any one of the above <1> to <25>.

<32> A coated film obtained by applying an emulsion composition as defined in any one of the above <1> to <25>, and then drying the emulsion composition.

<33> The dried film according to the above <31> or the coated film according to the above <32>, preferably for use in an anti-fouling film for inhibition depositions of powder dusts, a snow deposition inhibition film for inhibiting depositions of snow or ice, or an organism deposition inhibition film for inhibiting depositions of aquatic organisms.

<34> The dried film according to the above <31>, the coated film according to the above <32>, or the film according to the above <33>, wherein the thickness of the film is preferably 1 μm or more and 2000 μm or less, more preferably 3 μm or more and 1200 μm or less, even more preferably 5 μm or more and 500 μm or less, and even more preferably 5 μm or more and 200 μm or less.

<35> The dried film according to the above <31>, the coated film according to the above <32>, or the film according to the above <33> or <34>, wherein the arithmetic mean roughness of the film immediately after the production is preferably 0.3 μm or more and 40 μm or less, more preferably 0.5 μm or more and 35 μm or less, and even more preferably 0.8 μm or more and 30 μm or less.

<36> An inhibitor for depositions of organisms, an anti-fouling agent, or an inhibitor for depositions of snow, containing an emulsion composition as defined in any one of the above <1> to <25>.

<37> A method for inhibiting depositions of organisms, a method for soil protection, or a method for inhibiting depositions of snow, comprising applying an emulsion composition as defined in any one of the above <1> to <25> to a solid surface.

<38> Use of an emulsion composition as defined in any one of the above <1> to <25> as an inhibitor for depositions of organisms, an anti-fouling agent, or an inhibitor for depositions of snow.

<39> A film comprising a granular structure, containing
(A) one or more hydrophobically modified cellulose fibers selected from the group consisting of the following Component (a) and Component (b):
  (a) hydrophobically modified cellulose fibers in which cellulose fibers are bound to a silicone-based compound; and
  (b) hydrophobically modified cellulose fibers in which anionically modified cellulose fibers are bound at an anionic group thereof to a hydrocarbon-based compound having a cationic group having a total number of carbon atoms of 16 or more and 40 or less via ionic bonding; and
(C) an organic compound that is liquid at 25° C. and 1 atm.

<40> The film according to the above <39>, for use in an anti-fouling film for inhibiting depositions of powder dusts, a snow deposition inhibition film for inhibiting depositions of snow and ice, or an organism deposition inhibition film for inhibiting depositions of an aquatic organism.

<41> The film according to the above <39> or <40>, obtainable by drying an emulsion composition as defined in any one of the above <1> to <25>.

EXAMPLES

The present invention will be described more specifically by means of the following Examples. Here, the Examples are mere exemplifications of the present invention, without intending to limit the present invention thereto.

[Average Fiber Diameter, Average Fiber Length, and Average Aspect Ratio of Anionically Modified Cellulose Fibers and Hydrophobically Modified Cellulose Fibers]

Water is added to measurement subject cellulose fibers to provide a dispersion of which content is 0.0001% by mass. The dispersion is added dropwise to mica (mica), and dried to provide an observation sample. A fiber height of the subject cellulose fibers in the observation sample, i.e. a difference in heights of areas in which the fibers are present or absent, is measured with an atomic force microscope (AFM), Nanoscope II Tapping mode AFM, manufactured by Digital Instrument, a probe used being Point Probe (NCH) manufactured by NANOSENSORS. During that measurement, 100 or more sets of cellulose fibers are extracted in a microscopic image in which the cellulose fibers can be confirmed, and an average fiber diameter is calculated from the fiber heights of the fibers. An average fiber length is calculated from a distance in the direction of fibers. An average aspect ratio is calculated by an average fiber length/an average fiber diameter. The height analyzed in the image according to the AFM can be assumed to be a fiber diameter.

[Average Fiber Diameter and Average Fiber Length of Raw Material Cellulose Fibers]

Deionized water is added to measurement subject cellulose fibers, to provide a dispersion, a content of which is 0.01% by mass. The dispersion is measured with a wet-dispersion type image analysis particle counter manufactured by JASCO International Co., Ltd. under the trade name of IF-3200, under the conditions of a front lens: 2 folds, telecentric zoom lens: 1 fold, image resolution: 0.835 μm/pixel, syringe inner diameter: 6,515 μm, spacer thickness: 500 μm, image recognition mode: ghost, threshold value: 8, amount of analytical sample: 1 mL, and sampling: 15%. One hundred or more sets of cellulose fibers are measured, an average ISO fiber diameter thereof is calculated as an average fiber diameter, and an average ISO fiber length is calculated as an average fiber length.

[Anionic Group Content of Anionically Modified Cellulose Fibers and of Hydrophobically Modified Cellulose Fibers]

Measurement subject cellulose fibers with the mass of 0.5 g on a dry basis are placed in a 100 mL beaker, deionized water or a mixed solvent of methanol/water=2/1 is added thereto to make up a total volume of 55 mL. Five milliliters of a 0.01 M aqueous sodium chloride solution is added thereto to provide a dispersion, and the dispersion is stirred until the measurement subject cellulose fibers are sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-710," under the conditions of a waiting time of 60 seconds. The values of electroconductivity and a pH are measured every minute, and the measurements are continued up to a pH of 11 or so to obtain an electroconductivity curve. A titrated amount of sodium hydroxide is obtained from this electroconductivity curve, and the anionic group content of the measurement subject cellulose fibers is calculated in accordance with the following formula:

Anionic Group Content, mmol/g=[Titrated Amount of Sodium Hydroxide×Aqueous Sodium Hydroxide Solution Concentration (0.05 M)]/[Mass of Measurement Subject Cellulose Fibers (0.5 g)]

[Aldehyde Group Content of Oxidized Cellulose Fibers]

The carboxy group content of measurement subject oxidized cellulose fibers is measured in accordance with the method for measuring an anionic group content described above.

On the other hand, separately from above, 100 g of an aqueous dispersion of measurement subject oxidized cellulose fibers, a solid ingredient content of which is 1.0% by mass, 100 g of an acetate buffer, pH 4.8, 0.33 g of 2-methyl-2-butene, and 0.45 g of sodium chlorite are added to a beaker, and the contents are stirred at 25° C. for 16 hours, to carry out an oxidation treatment of the aldehyde group remaining in the oxidized cellulose fibers. After the termination of the reaction, the reaction mixture is washed with deionized water, to provide cellulose fibers of which aldehyde group is subjected to an oxidization treatment. A liquid reaction mixture is subjected to a freeze-drying treatment, and a carboxy group content of a dried product obtained is measured in accordance with the method for measurement of the anionic group content described above, and "a carboxy group content of the oxidized cellulose fibers which are subjected to an oxidization treatment" is calculated. Subsequently, an aldehyde group content of the measurement subject oxidized cellulose fibers is calculated according to the formula 1:

Aldehyde Group Content, mmol/g=(Carboxy Group Content of Oxidized Cellulose Fibers Which Are Subjected to Oxidization Treatment)−(Carboxy Group Content of Measurement Subject Oxidized Cellulose Fibers)  formula 1

[Solid Ingredient Content in Dispersion]

Using a halogen moisture balance manufactured by Shimadzu Corporation under the trade name of "MOC-120H," measurements with a one-gram sample are taken in a thermostat held at 150° C. every 30 seconds, and a value at which a weight loss is 0.1% or less of the initial amount of the sample is defined as a solid ingredient content.

[Confirmation of Crystal Structure in Hydrophobically Modified Cellulose Fibers]

The crystal structure of the hydrophobically modified cellulose fibers is confirmed by measuring with an X-ray diffractometer MinicFlex II manufactured by Rigaku Corporation under the following conditions.

The measurement conditions are: X-ray source: Cu/Kα-radiation, tube voltage: 30 kV, tube current: 15 mA, measurement range: diffraction angle 2θ=5° to 45°, and scanning speed of X-ray: 10°/min. A sample for the measurement is prepared by compressing pellets to a size having an area of 320 mm² and a thickness of 1 mm. Also, the crystallinity of the cellulose I crystal structure is calculated using X-ray diffraction intensity obtained based on the following formula A:

Cellulose I Crystallinity, %=[($I_{22.6}$−$I_{18.5}$)/$I_{22.6}$]×100  <Formula A> wherein $I_{22.6}$ is a diffraction intensity of a lattice face (002 face)(angle of diffraction 2θ=22.6°), and $I_{18.5}$ is a diffraction intensity of an amorphous portion (angle of diffraction 2θ=18.5°), in X-ray diffraction.

On the other hand, in a case where a crystallinity obtained by the above formula A is 35% or less, it is preferable to calculate the value based on the formula B given below, in accordance with the description of P199-200 of "*Mokushitsu Kagaku Jikken Manyuaru* (*Wood Science Experimental Manual*)," edited by The Japan Wood Research Society, from the viewpoint of improving the calculation accuracy.

Therefore, in a case where a crystallinity obtained by the above formula A is 35% or less, a calculated value based on the following formula B can be used as a crystallinity:

Cellulose I Crystallinity (%)=[$A_c/(A_c+A_a)$]×100 <Formula B> wherein $A_c$ is a total sum of peak areas of a lattice face (002 face)(angle of diffraction 2θ=22.6°), a lattice face (011 face)(angle of diffraction 2θ=15.1°), and a lattice face (0-11 face)(angle of diffraction 2θ=16.2°), $A_a$ is a peak area of an amorphous portion (angle of diffraction 2θ=18.5°), each peak area being calculated by fitting the X-ray diffraction chart obtained in a Gaussian function, in X-ray diffraction.

[Cellulose Fibers (Conversion Amount) in Hydrophobically Modified Cellulose Fibers]

The cellulose fibers (conversion amount) in the hydrophobically modified cellulose fibers are measured by the following methods:

(1) In a Case where "a Compound for Modification" to be Added is One Kind

The amount of the cellulose fibers (conversion amount) is calculated by the following formula C:

Amount of Cellulose Fibers (Conversion Amount), g=Mass of Hydrophobically Modified Cellulose Fibers, g/[1+Molecular Weight of Compound for Modification, g/mol×Binding Amount of Modifying Group, mmol/g×0.001] <Formula C>

(2) In a Case where "Compounds for Modification" to be Added are Two or More Kinds The amount of the cellulose fibers (conversion amount) is calculated, taking a molar ratio of each of the compounds (i.e., a molar ratio when a total molar amount of the compounds to be added is defined as 1) into consideration.

[Measurement of Viscosity of Emulsion Composition]

The viscosity after one minute is measured with a B type viscometer TVB-10 manufactured by TOKI SANGYO CO., LTD., using a No. 1 rotor at 25° C. and a rotational speed of 60 RPM.

[Observation of Emulsion Composition According to Cryo-SEM]

The observation of the emulsion composition according to Cryo-SEM is carried out with a field emission scanning electron microscope Scios Dual Beam manufactured by FEI. The observation is made while gradually subliming a water content from the frozen emulsion composition. The observation is carried out at an acceleration voltage of 2 kV and a magnification of 25,000 folds.

[Measurements of Particle Diameter of Emulsion Droplets According to Laser Diffraction Method]

The measurements of particle diameter of the emulsion droplets according to a laser diffraction method are carried out using LA-960 manufactured by Horiba, LTD.

Measurement conditions: Water is added to a cell for measurement, to measure a volume particle diameter distribution and a volume-median particle diameter $D_{50}$ at a concentration in which the absorbance falls within an appropriate range. Here, a relative refractive index is 1.20, a temperature is 25° C., a circulation pump is ON, a circulation rate is 5, and a stirring rate is 5.

[Preparation of Anionically Modified Cellulose Fibers]

Preparation Example 1

Needle-leaf bleached kraft pulp manufactured by West Fraser under the trade name of Hinton was used as raw material natural cellulose fibers. As TEMPO, a commercially available product manufactured by ALDRICH, Free radical, 98% by mass, was used. As sodium hypochlorite, sodium bromide, and sodium hydroxide, commercially available products were used.

First, in a 2-L beaker made of PP equipped with a mechanical stirrer and agitation blades, 10 g of the above bleached kraft pulp fibers and 990 g of deionized water were weighed out, and the contents were stirred at 25° C. and 100 rpm for 30 minutes. Thereafter, 0.13 g of TEMPO, 1.3 g of sodium bromide, and 35.5 g of an aqueous 10.5% by mass sodium hypochlorite solution were added in this order to 10 g of the pulp fibers. Using a pH stud titration with an automated titration instrument manufactured by DKK-TOA CORPORATION under the trade name of AUT-710, an aqueous 0.5 M sodium hydroxide solution was added dropwise thereto to keep a pH at 10.5. The reaction was carried out at 25° C. at a stirring rate of 100 rpm for 120 minutes, and the dropwise addition of the aqueous sodium hydroxide solution was then stopped, to provide a suspension of anionically modified cellulose fibers.

A 0.01 M hydrochloric acid was added to the suspension of anionically modified cellulose fibers obtained to adjust its pH to 2, and the anionically modified cellulose fibers were then sufficiently washed with deionized water, until the filtrate had a conductivity as measured with a compact electroconductivity meter LAQUA twin EC-33B, manufactured by HORIBA, Ltd. of 200 μs/cm or less in the conductivity measurement. The filtrate was then subjected to a dehydration treatment, to provide anionically modified cellulose fibers. Also, the anionically modified cellulose fibers had a carboxy group content of 1.50 mmol/g and an aldehyde group content of 0.23 mmol/g.

Preparation Example 2—Production of Finely Pulverized Anionically Modified Cellulose Fibers Deionized water was added to the anionically modified cellulose fibers finally obtained in Preparation Example 1, to prepare 100 g of a suspension, a solid ingredient content of which was 2.0% by mass. An aqueous 0.5 M sodium hydroxide solution was added thereto to adjust its pH to 8, and deionized water was then added thereto to make up a total amount of 200 g. This suspension was subjected three times to a finely pulverizing treatment with a high-pressure homogenizer manufactured by YOSHIDA KIKAI CO., LTD. under the trade name of NanoVater L-ES at 150 MPa, to provide a dispersion of finely pulverized anionically modified cellulose fibers, a solid ingredient content of which was 1.0% by mass. The counterions of the carboxy groups owned by the finely pulverized anionically modified cellulose fibers were sodium ions. The finely pulverized anionically modified cellulose fibers are abbreviated as "TCNF (Na form)."

Preparation Example 3—Production of Finely Pulverized Anionically Modified Cellulose Fibers of which Aldehyde Group was Subjected to Reducing Treatment The amount 182 g of the dispersion of finely pulverized anionically modified cellulose fibers obtained in Preparation Example 2, a solid ingredient content of which was 1.0% by mass was weighed out, and deionized water was added thereto to make up a total amount of 400 g. Thereto were added 1.2 mL of an aqueous 0.1 M sodium hydroxide solution, and 120 mg of sodium borohydride, and the mixture was stirred at 25° C. for 4 hours. Next, 9 mL of 1 M hydrochloric acid was added thereto, to carry out protonation. After the termination of the reaction, the reaction mixture was filtered, and a cake obtained was washed 6 times with deionized water to remove salts and hydrochloric acid, to provide a dispersion of finely pulverized anionically modified cellulose fibers of which aldehyde group was subjected to a reducing treatment, a solid ingredient content of which was 0.9% by mass. The cellulose fibers obtained had a carboxy group content of 1.50 mmol/g, and an aldehyde group content of 0.02 mmol/g. The carboxy group owned by the finely pulverized anionically modified cellulose fibers had a free acid form (COOH), which is abbreviated as "TCNF (H-form)." The finely pulverized anionically modified cellulose fibers had an average fiber diameter of 3.3 nm and an average fiber length of 600 nm.

[Production of Hydrophobically Modified Cellulose Fibers and Emulsion Compositions]

Example 1

Figure 2:
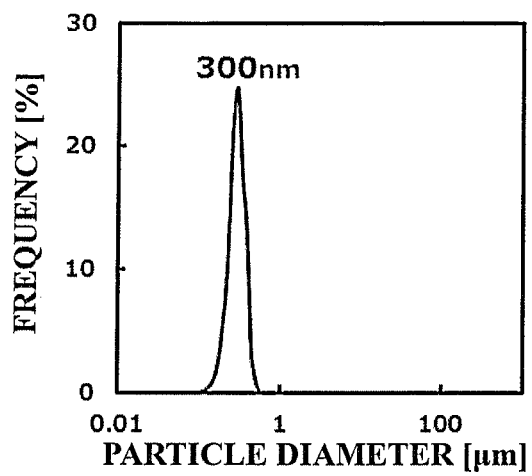
FIG. 2 is a graph showing a particle size distribution of emulsion droplets of the emulsion composition produced in Example 1.

In a beaker were mixed 66.7 g of the dispersion of finely pulverized anionically modified cellulose fibers obtained in Preparation Example 3, a solid ingredient content of which was 0.9% by mass, 12.0 g of Silicone oil 1, 1.53 g of Amino-modified silicone 1, corresponding to one equivalent based on the carboxy groups of the anionically modified cellulose fibers. Deionized water was added thereto to make up a total amount of 100 g. This solution was stirred with a mechanical stirrer for 5 minutes, and the mixture was then subjected to a 10-pass treatment with a high-pressure homogenizer manufactured by YOSHIDA KIKAI CO., LTD. under the trade name of NanoVater L-ES at 150 MPa, to provide an emulsion composition containing hydrophobically modified cellulose fibers, in which the anionically modified cellulose fibers were bound to the amino-modified silicone via ionic bonding. The resulting composition was a white turbid liquid, and the behavior in which oil droplets were dispersed in water was observed with an optical microscope and Cryo-SEM, so that it was judged to be an emulsion composition. FIG. 1 shows a photomicrograph according to Cryo-SEM of the emulsion composition produced in Example 1 (25,000 folds). Further, it could be seen that the average particle diameter of the emulsion composition was 300 nm, from the measurement according to the laser diffraction method. FIG. 2 shows a graph showing a particle diameter distribution of the emulsion droplets of the emulsion composition obtained according to the laser diffraction method.

Example 2

The same procedures as in Example 1 were carried out except that the amount of the silicone oil was changed to 1.2 g, to provide an emulsion composition containing hydrophobically modified cellulose fibers in which the anionically modified cellulose fibers were bound to the amino-modified silicone via ionic bonding.

Example 3

The same procedures as in Example 1 were carried out except that Silicone oil 2 was used in place of Silicone oil 1, to provide an emulsion composition containing hydrophobically modified cellulose fibers in which the anionically modified cellulose fibers were bound to the amino-modified silicone via ionic bonding.

Example 4

The same procedures as in Example 1 were carried out except that isopropyl myristate was used in place of the silicone oil, to provide an emulsion composition containing hydrophobically modified cellulose fibers in which the anionically modified cellulose fibers were bound to the amino-modified silicone via ionic bonding.

Example 5

The same procedures as in Example 1 were carried out except that Amino-modified silicone 2 in an amount corresponding to the same equivalent was used in place of Amino-modified silicone 1, to provide an emulsion composition containing hydrophobically modified cellulose fibers in which the anionically modified cellulose fibers were bound to the amino-modified silicone via ionic bonding.

Example 6

The same procedures as in Example 1 were carried out except that the amount of the amino-modified silicone was changed to 0.77 g, corresponding to 0.5 equivalents to the carboxy groups of the anionically modified cellulose fibers, to provide an emulsion composition containing hydrophobically modified cellulose fibers in which the anionically modified cellulose fibers were bound to the amino-modified silicone via ionic bonding.

Example 7

In a beaker were mixed 22.2 g of the dispersion of finely pulverized anionically modified cellulose fibers obtained in Preparation Example 3, a solid ingredient content of which was 0.9% by mass, 40.0 g of Silicone oil 1 mentioned above, 0.51 g of Amino-modified silicone 1 mentioned above, corresponding to one equivalent to the carboxy groups of the anionically modified cellulose fibers, and deionized water was added thereto to make up a total amount of 100 g. Subsequently, the mixture was treated in the same manner as in Example 1, to provide an emulsion composition containing hydrophobically modified cellulose fibers in which the anionically modified cellulose fibers were bound to the amino-modified silicone via ionic bonding.

Example 8

One hundred grams of the emulsion composition obtained in Example 1 was weighed out in a beaker, 0.2 g of Polyether-modified silicone 1 was added thereto, and the mixture was stirred at 25° C. for 30 minutes, to provide an emulsion composition.

Example 9

In a beaker were mixed 66.7 g of the dispersion of finely pulverized anionically modified cellulose fibers obtained in Preparation Example 3, a solid ingredient content of which was 0.9% by mass, and 1.53 g of Amino-modified silicone 1, and deionized water was added thereto to make up a total amount of 88 g. This solution was stirred with a mechanical stirrer for 5 minutes, and the mixture was then subjected to a 5-pass treatment with a high-pressure homogenizer manufactured by YOSHIDA KIKAI CO., LTD. under the trade name of NanoVater L-ES at 150 MPa, to provide an aqueous dispersion of hydrophobically modified cellulose fibers, in which the anionically modified cellulose fibers were bound to the amino-modified silicone via ionic bonding. To the aqueous dispersion obtained was added 12.0 g of Silicone oil 1, and the mixture was subjected to a 5-pass treatment with a high-pressure homogenizer manufactured by YOSHIDA KIKAI CO., LTD. under the trade name of NanoVater L-ES at 150 MPa, to provide an emulsion composition.

Example 10

The same procedures as in Example 1 were carried out except that the amount of the silicone oil was changed to 0.6 g, to provide an emulsion composition containing hydrophobically modified cellulose fibers, in which the anionically modified cellulose fibers were bound to the amino-modified silicone via ionic bonding.

Example 11

In a beaker were mixed 8.9 g of the dispersion of finely pulverized anionically modified cellulose fibers obtained in Preparation Example 3, a solid ingredient content of which was 0.9% by mass, 40.0 g of Silicone oil 1 mentioned above, 0.20 g of Amino-modified silicone 1 mentioned above, corresponding to one equivalent based on the carboxy groups of the anionically modified cellulose fibers, and deionized water was added thereto to make up a total amount of 100 g. Subsequently, the mixture was treated in the same manner as in Example 1, to provide an emulsion composition containing hydrophobically modified cellulose fibers in which the anionically modified cellulose fibers were bound to the amino-modified silicone via ionic bonding.

Example 12

The same procedures as in Example 1 were carried out except that oleylamine manufactured by Wako Pure Chemical Industries, Ltd. in an amount corresponding to the same equivalent was used in place of Amino-modified silicone 1, to provide an emulsion composition containing hydrophobically modified cellulose fibers in which the anionically modified cellulose fibers were bound to oleylamine via ionic bonding. Further, 0.2 g of Polyether-modified silicone 1 was added thereto, and the mixture was stirred at 25° C. for 30 minutes, to provide an emulsion composition.

Example 13

To 20 g of the emulsion composition obtained in Example 1 was added 200 mg of 4-(4,6-dimethoxy-1,3,5-triazin-2-yl)-4-methylmorpholinium chloride manufactured by FUJI-FILM Wako Pure Chemical Corporation, and the mixture was stirred at room temperature, 25° C., for 24 hours. Next, this solution was placed in a dialytic membrane Spectra/Por, manufactured by SPECTRUM, MWCO: 10 kDa), and dialyzed against deionized water under the room temperature, 25° C., for 48 hours to purify, to provide an emulsion composition containing hydrophobically modified cellulose fibers which were bound to the amino-modified silicone via an amide bonding.

Comparative Example 1

In a beaker were mixed 60.0 g of the dispersion of finely pulverized anionically modified cellulose fibers obtained in Preparation Example 2, a solid ingredient content of which was 1.0% by mass, and 12.0 g of Silicone oil 1 mentioned above, and deionized water was added thereto to make up a total amount of 100 g. This solution was stirred with a mechanical stirrer for 5 minutes, and the mixture was then subjected to a 10-pass treatment with a high-pressure homogenizer manufactured by YOSHIDA KIKAI CO., LTD. under the trade name of NanoVater L-ES at 150 MPa, to provide an emulsion composition containing anionically modified cellulose fibers.

Comparative Example 2

In a beaker were mixed 66.6 g of the dispersion of finely pulverized anionically modified cellulose fibers obtained in Preparation Example 3, a solid ingredient content of which was 0.9% by mass, and 12.0 g of Silicone oil 1 mentioned above, and deionized water was added thereto to make up a total amount of 100 g. This solution was stirred with a mechanical stirrer for 5 minutes, and the mixture was then subjected to a 10-pass treatment with a high-pressure homogenizer manufactured by YOSHIDA KIKAI CO., LTD. under the trade name of NanoVater L-ES at 150 MPa, to provide an emulsion composition containing anionically modified cellulose fibers.

Comparative Example 3

The same procedures as in Example 1 were carried out except that Polyether amine 1 was used in place of Amino-modified silicone 1, to provide an emulsion composition containing hydrophobically modified cellulose fiber in which the anionically modified cellulose fibers were bound to the polyether amine via ionic bonding.

Comparative Example 4

The same procedures as in Example 1 were carried out except that octylamine manufactured by FUJIFILM Wako Pure Chemical Corporation was used in place of Amino-modified silicone 1, to provide an emulsion composition containing hydrophobically modified cellulose fiber in which the anionically modified cellulose fibers were bound to octylamine via ionic bonding.

Comparative Example 5

The same procedures as in Example 1 were carried out except that triethylamine manufactured by FUJIFILM Wako Pure Chemical Corporation was used in place of Amino-modified silicone 1, to provide an emulsion composition containing hydrophobically modified cellulose fiber in which the anionically modified cellulose fibers were bound to triethylamine via ionic bonding.

Comparative Example 6

The dispersion of finely pulverized anionically modified cellulose fibers obtained in Preparation Example 3 was repeatedly washed with isopropyl alcohol to carry out solvent replacement. The dispersion was diluted with isopropyl alcohol until the solid ingredient content was 0.5% by mass, and 100 g of this dispersion was weighed out in a beaker. Next, 0.51 g of Amino-modified silicone 1, corresponding to 0.4 equivalents based on the carboxy groups of the finely pulverized anionically modified cellulose fibers, was mixed with this dispersion. This solution was stirred with a mechanical stirrer for 5 minutes, and the mixture was then subjected to a 5-pass treatment with a high-pressure homogenizer manufactured by YOSHIDA KIKAI CO., LTD. under the trade name of NanoVater L-ES at 150 MPa, to provide an isopropyl alcohol dispersion of hydrophobically modified cellulose fibers, in which the anionically modified cellulose fibers were bound to the amino-modified silicone via ionic bonding.

Further, 10.0 g of squalane was added to this dispersion, and the mixture was stirred at 25° C. for 30 minutes, to provide a coating liquid. This coating liquid was not an emulsion composition such as those in Examples and Comparative Examples mentioned above, but was in a state in which squalane was dissolved in isopropyl alcohol, and the hydrophobically modified cellulose fibers were dispersed in the isopropyl alcohol.

The details of the representative components used in Examples and the like were summarized as follows.

[Compound for Modification]

Amino-modified silicone 1: "SS-3551" manufactured by Dow Corning-Toray Co., Ltd., kinetic viscosity: 1,000, amino equivalence: 1,700

Amino-modified silicone 2: "SF-8452C" manufactured by Dow Corning-Toray Co., Ltd., kinetic viscosity: 600, amino equivalence: 6,400

Oleylamine: manufactured by FUJIFILM Wako Pure Chemical Corporation, amino equivalence: 267.5, a total number of carbon atoms: 18

Polyether amine 1: "M-2070" manufactured by Huntsman, amino equivalence: 2,000

[Component (C)]

Silicone oil 1: "KF-96-10cs" manufactured by Shin-Etsu Chemical Co., Ltd., SP value: 7.3

Isopropyl myristate: manufactured by FUJIFILM Wako Pure Chemical Corporation, SP value: 8.5

Silicone oil 2: "KF-96H-10000cs" manufactured by Shin-Etsu Chemical Co., Ltd., SP value: 7.3

Silicone oil 3: "KF-96-100cs" manufactured by Shin-Etsu Chemical Co., Ltd., SP value: 7.3

Silicone oil 4: "KF-96-3000cs" manufactured by Shin-Etsu Chemical Co., Ltd., SP value: 7.3

Squalane: manufactured by FUJIFILM Wako Pure Chemical Corporation, SP value: 7.9

[Component (D)]

Polyether-modified silicone 1: "KF-640" manufactured by Shin-Etsu Chemical Co., Ltd., HLB: 14

[Measurement of Stability of Emulsion Composition]

Each of the emulsion compositions produced in Examples 1 to 13 and Comparative Examples 1 to 6 was weighed out in a 30 mL glass vial, and allowed to stand at 25° C. for one week. In all the samples except for Example 9, creaming or unification was not observed, showing high emulsion stability. On the other hand, in the sample in Example 9, creaming was observed two days after the production. It could be seen from the above that the emulsion compositions of Examples 1 to 8, and 10 to 13 were more excellent in stability with the passage of time of the emulsion systems than the emulsion composition of Example 9.

Here, when Example 1 was compared with Example 9, it was shown that a more stable emulsion composition was obtained when the cellulose fibers and the silicone-based compound were mixed in the presence of both an organic compound that was liquid at 25° C. at 1 atm and water, in other words, the hydrophobically modified cellulose fibers were produced in the presence of both the components.

[Production of Dried Films]

Each of the emulsion compositions produced in Examples 1 to 13 and Comparative Examples 1 to 2, 4, 5 and 6, and the coating liquid produced in Comparative Example 3 was applied in an amount of 2 mL to a separate glass substrate Micro Slide Glass S2112 manufactured by MATSUNAMI, and spread over the entire area of the slide glass. Next, the coating was dried at 1 atm, 25° C., and humidity of about 40% RH for 24 hours, to produce a film. The thickness of the film of Example 1 as measured accordance with the following measurement method was 90 µm.

Figure 3:
FIG. 3 is a photomicrograph (magnification: 8,000 folds) with SEM of a dried film of the emulsion composition produced in Example 1.

In addition, the cross section of the dried film produced using the emulsion composition obtained in Example 1 was observed with a SEM in accordance with the method described as follows. As a result, it could be seen that the dried film is composed of a granular structure. FIG. 3 is a photomicrograph (magnification: 8000 folds) according to SEM of the cross section of the dried film.

[Measurement of Thickness of Film]

The thickness of the film after drying was measured with a laser microscope VK-9710 manufactured by KEYENCE under the following measurement conditions. The measurement conditions were an objective lens: 10 folds, optical amount: 3%, lightness: 1548, and Z pitch: 0.5 µm. A part of the film was scraped off with a metallic spatula, to measure a sample in which a glass substrate was exposed. A height of the glass substrate and a height of the parts having a film were measured using an installed image-processing software, and a difference therebetween was taken to obtain a thickness of the film.

[Observation of Cross-Sectional Structure of Film]

A dried film was frozen with liquid nitrogen, and the frozen film was cut with a knife to expose its cross section. The sample was recovered to room temperature, 25° C., and then subjected to an osmium deposition treatment, and the cross section thereof was observed with a field emission scanning electron microscope Scios Dual Beam manufactured by FEI. The observation was made at an acceleration voltage of 5 kV and a magnification of 8000 folds.

[Measurement of Arithmetic Mean Roughness of Film]

The arithmetic mean roughness of the surface of the dried films of Examples 1 and 8 and Comparative Example 6 produced as described above was measured. The arithmetic mean roughness of the film was measured with a laser microscope VK-9710 manufactured by KEYENCE under the following conditions. The measurement conditions were an objective lens: 10 folds, optical amount: 3%, lightness: 1548, and Z pitch: 0.5 µm. The arithmetic mean roughness was determined at 5 points using an installed image processing software, and an average thereof was used.

[Measurement of Water Resistance of Dried Films]

Each of the dried films of Examples 1 to 13 and Comparative Examples 1 to 6 produced as described above were furnished. Oils floating to the surface of the dried film were wiped off, and the dried film together with the glass substrate was then immersed in a 300 mL beaker filled with water, and swelling degrees of the dried films after 5 minutes and after 30 minutes were calculated in accordance with the following formula E. Here, in a case where the dried film was collapsed and dispersed in water, it was indicated as "collapsed," in place of the swelling degree. The results are shown in the following tables.

$$\text{Swelling Degree, \%} = [\{[\text{Mass After Immersion}] - [\text{Mass of Glass Substrate Before Coating}]\} \div \{[\text{Mass Before Immersion}] - [\text{Mass of Glass Substrate Before Coating}]\} - 1] \times 100 \quad \text{<Formula E>}$$

wherein the mass after immersion: The mass of a glass substrate after immersion of the glass substrate and a dried film formed on the substrate for a given length of time; and the mass before immersion: The mass of a glass substrate before immersion of the glass substrate and a dried film formed on the substrate in water for a given length of time.

[Test for Measurement of Sliding Angle]

Each of the dried films of Examples 1 to 13 and Comparative Examples 1 to 6 produced as described above was set in a horizontal state, and to each film was added dropwise 8 µL of water droplets at 23° C. with a fully automatic contact angle meter FAMAS, manufactured by Kyowa Interface Science Co., Ltd. at 23° C., and allowed to stand for 1 second. Next, the film surface was slanted to an angle of 85° at a rate of 1°/s, and an angle at which the liquid droplets began sliding was measured. The measurement results were shown in the following tables. Here, in a case where the droplets did not slide down even at an angle of 85°, the sliding angle of the water droplets was listed as "85 or more." The lower the value for the sliding angle of water droplets, the higher the slippery properties of the film.

TABLE 1-1

| Modifying group | | Compound for modification | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| | | | Amino-modified silicone 1 | | | | Amino-modified silicone 2 | Amino-modified silicone 1 | | | |
| | | Equivalence based on anionic groups* | | 1 | | | 1 | 0.5 | | 1 | |
| Components** | A-2 | Compound for modification | | 1.53 | | | 5.76 | 0.77 | 0.51 | | 1.53 |
| | A-1 | TCNF (H-form) | | | | 0.6 | | | 0.2 | 0.6 | |
| | C | Silicone oil 1 SP value:7.3 | 12 | 1.2 | — | — | 12 | 12 | 40 | 12 | |
| | | Silicone oil 2 SP value:7.3 | — | — | 12 | — | — | — | — | — | — |
| | | Isopropyl myristate SP value:8.5 | — | — | — | 12 | — | — | — | — | — |
| | D | Polyether-modified silicone 1 | — | — | — | — | — | — | — | 0.2 | — |
| | B | Water | | | | | Balance | | | | |
| | | A/C mass ratio | 0.18 | 1.8 | 0.18 | 0.18 | 0.53 | 0.11 | 0.018 | 0.18 | 0.18 |
| Evaluation Results | | Sliding angle of water droplets, degrees | 11 | 6 | 3 | 10 | 13 | 48 | 51 | 6 | 18 |
| | | Viscosity of emulsion composition, mPa·s | 9.3 | 6.5 | 12.6 | 19 | 12.1 | 7.8 | 20.9 | 8.8 | 20.3 |
| | | Swelling rate (5 minutes) | 3.6% | 1.2% | 1.8% | 4.3% | 0.3% | 2.8% | 0.4% | 1.7% | 1.3% |
| | | Swelling rate (30 minutes) | 4.6% | 1.6% | 2.7% | 7.7% | 0.7% | 3.2% | 0.8% | 2.2% | 1.6% |

*Equivalence based on anionic groups of the anionically modified cellulose fibers
**% by mass

TABLE 1-2

| Modifying group | | Compound for modification | Ex. 1 | Ex. 2 | Ex. 3 | Ex. 4 |
|---|---|---|---|---|---|---|
| | | | Amino-modified silicone 1 | | Oleylamine | Amino-modified silicone 1 |
| | | Equivalence based on anionic groups* | | | 1 | |
| Components** | A-2 | Compound for modification | 1.53 | 0.2 | 0.12 | 1.53 |
| | A-1 | TCNF (H-form) | 0.6 | 0.08 | 0.6 | 0.6 |
| | C | Silicone oil 1 SP value:7.3 | 0.6 | 40 | 12 | 12 |
| | | Silicone oil 2 SP value:7.3 | — | — | — | — |
| | | Isopropyl myristate SP value:8.5 | — | — | — | — |
| | D | Polyether-modified silicone 1 | — | — | 0.2 | — |
| | B | Water | | | Balance | |
| | | A/C mass ratio | 3.6 | 0.007 | 0.06 | 0.18 |
| Evaluation Results | | Sliding angle of water droplets, degrees | 31 | 46 | 23 | 28 |
| | | Viscosity of emulsion composition, mPa·s | 7.1 | 34.3 | 23.3 | 14.3 |
| | | Swelling rate (5 minutes) | 0.0% | 0.6% | 3.9% | 0.6% |
| | | Swelling rate (30 minutes) | 1.8% | 1.1% | 9.1% | 1.2% |

*Equivalence based on anionic groups of the anionically modified cellulose fibers
**% by mass

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Modifying group | Compound for modification | — | — | Polyether amine 1 | Octyl-amine | Triethyl-amine | Amino-modified silicone 1 |
| | Total number of carbon atoms of hydrocarbon-based compound | — | — | — | 8 | 6 | — |
| | Amino Equivalence | — | — | 2000 | 129 | 101 | 1700 |
| | Equivalence based on anionic groups* | — | — | 1 | — | — | 0.4 |
| Components** | Compound for modification | — | — | 1.80 | 0.12 | 0.09 | 0.51 |
| A-1 | TCNF (H-form) | — | — | 0.6 | — | — | 0.5 |
| A-1 | TCNF (Na-form) | 0.6 | — | — | — | — | — |
| C-1 | Silicone oil 1, SP value: 7.3 | — | — | 12 | — | — | — |
| C-2 | Squalane, SP value: 7.9 | — | — | — | — | — | 10 |
| B-1 | Water | — | — | Balance | — | — | — |
| B-2 | Isopropyl alcohol | — | — | — | — | — | Balance |
| | A/C | 0.05 | — | 0.2 | 0.06 | 0.06 | 0.05 |
| Evaluation Results | Sliding angle of water droplets, degrees | 85 or more | 85 or more | 85 or more | 85 or more | 85 or more | 40 |
| | Viscosity of emulsion composition, mPa·s | 684 | 101.5 | 960 | 9.9 | 285.1 | 265 |
| | Swelling rate (5 minutes) | 55.6% | 384.1% | 176.2% | 76.1% | 70.5% | 6.8% |
| | Swelling rate (30 minutes) | Collapsed | Collapsed | 426.5% | Collapsed | Collapsed | 16.6% |

*Equivalence based on anionic groups of the anionically modified cellulose fibers
**% by mass From the above tables, it could be seen as follows.

It could be seen that the film obtained by drying an emulsion composition described in the present invention shows slippery properties. In considerations of the components of Example 1 and the components of Example 6, it could be seen that Example 1 which had a higher degree of introduction of a silicone group, a modifying group, had more excellent slippery properties. In considerations of the components of Example 1, the components of Example 2, and the components of Example 7, it was observed that the larger the amount of the organic compound that was liquid at 25° C. and 1 atm, based on the hydrophobically modified cellulose fibers, in other words, the smaller the A/C ratio, the slippery properties are likely to be lowered.

[Durability Test of Slippery Properties]

In order to examine the durability of the films produced in Examples 1 and 8 and Comparative Example 6, a substrate on which each of these films was produced, which was produced in [Production of Dried Films] mentioned above, was held horizontally, and water was continuously added dropwise from a height 40 cm above the substrate at a flow rate of 50 mL/seconds. At three points before the dropwise addition, after 5 minutes of dropwise addition, and after 20 minutes of dropwise addition, the arithmetic mean roughness and the slippery properties of the films were measured. The arithmetic mean roughness of the films was measured in accordance with the method described above. As to the slippery properties, a substrate was held at an angle of 15° to a horizontal direction, 10 μL of water droplets were placed thereon, and it was judged such that when the droplets were slid down, it was slippery, and that when the droplets did not slide down, it was not slippery.

TABLE 3

| | | Ex. 1 | Ex. 8 | Comp. Ex. 6 |
|---|---|---|---|---|
| Before dropwise addition | Arithmetic mean roughness of film, μm | 1.0 | 1.0 | 1.0 |
| | Slippery Property | slippery | slippery | slippery |
| After 5 minutes from dropwise addition | Arithmetic mean roughness of film, μm | 1.4 | 1.1 | 9.3 |
| | Slippery Property | slippery | slippery | not slippery |
| After 20 minutes from dropwise addition | Arithmetic mean roughness of film, μm | 2.2 | 1.3 | 8.3 |
| | Slippery Property | not slippery | slippery | not slippery |

From the above Table 3, it could be seen as follows.

It could be seen that the films obtained by drying the emulsion compositions of Examples 1 and 8 had controlled roughness of the films after water was continuously added dropwise and continued slippery properties, as compared to the film obtained by drying the coating liquid of Comparative Example 6, so that the films were more excellent in durability. Further, it could be seen that the film obtained by drying the emulsion composition further containing a polyether-modified silicone compound of Example 8 had more excellent durability.

Example 14

The same procedures as in Example 1 were carried out except that the amount of Silicone oil 1 was changed to 6 g, to provide an emulsion composition containing hydrophobically modified cellulose fibers in which anionically modified cellulose fibers were bound to Amino-modified silicone 1 via ionic bonding.

Example 15

In a beaker 100 g of an emulsion composition obtained in Example 14 was weighed out, 0.2 g of Polyether-modified silicone 1 was added thereto, and the mixture was stirred at 25° C. for 30 minutes, to provide an emulsion composition.

Example 16

The same procedures as in Example 14 were carried out except that Silicone oil 2 was used in place of Silicone oil 1, to provide an emulsion composition containing hydrophobically modified cellulose fibers in which anionically modified cellulose fibers were bound to Amino-modified silicone 1 via ionic bonding.

Test Example 1—Test of Depositions of Aquatic Organisms in Open

Each of the emulsion compositions prepared in Examples 14 to 16 was applied to a SUS304 substrate (L 50 mm×W 50 mm×T 3 mm) in an amount of 1.5 mL, and dried at 1 atm, 25° C., and humidity of about 40% RH for 24 hours to produce a film. Here, an untreated SUS304 substrate of L 50 mm×W 50 mm×T 3 mm was used as Comparative Example 7.

Each of the substrates mentioned above was connected with a chain, and set in seawater near the Shimotsu Port, Wakayama-ken at a depth of 2 mm from the sea level at low tide, and the immersion test was carried out in the seawater for 3 months.

After one month and three months from the immersion, the degree of depositions of crustaceans and algae to the substrate was visually evaluated. The evaluation criteria are as follows. The smaller the numerical value, the higher the effects of inhibiting depositions of aquatic organisms.

1: A state in which the depositions of aquatic organisms are in an amount of 2% by area or less of the substrate surface.
2: A state in which the depositions of aquatic organisms are in an amount of exceeding 2% by area and 10% by area or less of the substrate surface.
3: A state in which the depositions of aquatic organisms are in an amount of exceeding 10% by area and 20% by area or less of the substrate surface.
4: A state in which the depositions of aquatic organisms are in an amount of exceeding 20% by area and 30% by area or less of the substrate surface.
5: A state in which the depositions of aquatic organisms are in an amount of exceeding 30% by area and 50% by area or less of the substrate surface.
6: A state in which the depositions of aquatic organisms are in an amount of exceeding 50% by area and 80% by area or less of the substrate surface.
7: A state in which the depositions of aquatic organisms are in an amount of exceeding 80% by area of the substrate surface.

Test Example 2—Test of Removing Depositions of Aquatic Organisms

The removability of the aquatic organisms deposited on a substrate after 1 month immersion and after 3 month immersion in Test Example 1 mentioned above was evaluated in accordance with the following criteria. Here, a low pressure as used herein indicates a low pressure that can be blown with a wash bottle. The smaller the numerical value, the aquatic organisms can be more easily removed.

1: Easily removable with a low-pressure washing with water.
2: Procedures of washing with water and scrubbing are needed.
3: A tool must be used (removed by scraping therewith once).
4: Procedures of scraping a plural times with a tool are needed, or irremovable.

The above results are shown in Table 4.

TABLE 4

| | | | Ex. 14 | Ex. 15 | Ex. 16 | Comp. Ex. 7 |
|---|---|---|---|---|---|---|
| Modifying group | | Compound for modification | Amino-modified silicone 1 | | | — |
| | | Equivalence based on anionic groups* | | 1 | | |
| Components** | A-2 | Compound for modification | 1.53 | | | |
| | A-1 | TCNF(H-form) | 0.6 | | | |
| | C | Silicone oil 1 SP value: 7.3 | 6 | 6 | — | |
| | C | Silicone oil 2 SP value: 7.3 | — | — | 6 | |
| | D | Polyether-modified silicone 1 | — | 0.2 | — | |
| | B | Water | | Balance | | |
| A/C mass ratio | | | 0.36 | 0.36 | 0.36 | |
| Substrate for producing film | | | SUS | SUS | SUS | SUS |
| Test for depositions of organisms, 1 to 7 | Crustaceans | 1 mo. | 1 | 1 | 1 | 5 |
| | Algae | | 4 | 2 | 5 | 7 |
| Removability upon deposition of organisms, 1 to 4 | | | 2 | 1 | 2 | 4 |
| Test for depositions of organisms, 1 to 7 | Crustaceans | 3 mos. | 1 | 1 | 1 | 6 |
| | Algae | | 5 | 3 | 6 | 7 |
| Removability upon deposition of organisms, 1 to 4 | | | 2 | 1 | 2 | 4 |

*Equivalence based on anionic groups of the anionically modified cellulose fibers
**% by mass It could be seen from Table 4 that the films formed by using the emulsion composition of the present invention had the effects capable of inhibiting the deposition of aquatic organisms themselves, and also had excellent removability of the deposited aquatic organisms. In particular, it could be seen that the film formed by using the emulsion composition of Example 15 had excellent effects of inhibiting the deposition of aquatic organisms and excellent removability, and that the effects can be continued over a long period of time of 3 months.

Example 17

The same procedures as in Example 1 were carried out except that Silicone oil 3 was used in place of Silicone oil 1, and that Amino-modified silicone 1 was used in an amount of 1.91 g, corresponding to 1.25 equivalents based on the carboxy groups of the anionically modified cellulose fibers, to provide an emulsion composition.

Example 18

One hundred grams of an emulsion composition obtained in Example 17 was weighed in a beaker, 0.2 g of Polyether-modified silicone 1 was added thereto, and the mixture was stirred at 25° C. for 30 minutes, to provide an emulsion composition.

Example 19

The same procedures as in Example 18 were carried out except that the amount of the silicone oil was changed to 4.0 g, to provide an emulsion composition.

Example 20

The same procedures as in Example 18 were carried out except that Silicone oil 1 was used in place of Silicone oil 3, to provide an emulsion composition.

Example 21

The same procedures as in Example 18 were carried out except that Silicone oil 4 was used in place of Silicone oil 3, to provide an emulsion composition.

[Production of Dried Films]

Each of the emulsion compositions produced in Examples 17 to 21 was applied in an amount of 2.4 mL to a separate glass substrate (10 cm×10 cm×thickness 5 mm), and spread over the entire area of the glass substrate. Next, the coating was dried at 1 atm, 25° C., and humidity of about 40% RH for 24 hours, to produce a film. The thickness of the film of Example 17 as measured accordance with the following measurement method was 20 µm.

Comparative Examples 8 and 9

In Comparative Example 8, the glass substrate itself was used.

In Comparative Example 9, a commercially available snow deposition inhibition paint "Raku-setsu Toryo (*Easy Snow Removal Paint*) manufactured by Kansai Paint Co., Ltd." was applied and spread with a paintbrush to the same substrate as that used in Example 1, and allowed to dry at 1 atm, 25° C., and humidity of about 40% RH for 24 hours. The thickness of the paint was 20 µm.

Test Example—Evaluation Test for Crushed Ice Slidability

Each of the substrates of Examples 17 to 21 and Comparative Examples 8 to 9 was fixed to a platform slanted at an angle of 45° with a double-sided tape (Scotch Ultrastrong Double-Sided Tape, Super-versatile, width 12 mm, manufactured by 3M). Next, crushing ice was allowed to fall on each substrate surface in a room at a temperature of 2° C. with an electromotive shaving ice machine DTY19, manufactured by DOSHISHA CORPORATION, and the ice slidability was evaluated in accordance with the following criteria. The higher the numerical value, the higher the ice slidability. Here, the specific gravity of the crushed ice was 0.49 g/cm$^3$.

5: Ninety percent or more of ice slid down.
4: Eighty percent or more and less than 90% of ice slid down.
3: Fifty percent or more and less than 80% of ice slid down.
2: Twenty percent or more and less than 50% of ice slid down.
1: Less than 20% of ice slid down.

Test Example—Evaluation Test for Snow Slidability

In a low-temperature test room (1° C.) of MTS Institute Inc., the snow slidability was evaluated.

A stainless steel piece of 1 cm×2 cm×t 2 mm was adhered to a backside of each of the substrates of Examples 17 to 21 and Comparative Examples 8 to 9 with a double-sided tape (Scotch Ultrastrong Double-Sided Tape, Super-versatile, width 12 mm, manufactured by 3M), and the substrate was set an angle of 900 to a fixing platform equipped with a magnet. Next, artificial snow was air-sprayed from a front side of the substrate at a wind speed of 5 m/s for 30 minutes, and the snow slidability was evaluated in accordance with the following criteria. The higher the numerical value, the higher the snow slidability. Here, the specific gravity of artificial snow was 0.29 g/cm$^3$.

5: Snow slid within 10 minutes.
4: Snow slid within 15 minutes.
3: Snow slid within 20 minutes.
2: Snow slid within 30 minutes.
1: Snow did not slide within the test time of 30 minutes.

TABLE 5

| | | | Ex. 17 | Ex. 18 | Ex. 19 | Ex. 20 | Ex. 21 | Comp. Ex. 8 | Comp. Ex. 9 |
|---|---|---|---|---|---|---|---|---|---|
| Modifying group | | Compound for modification | Amino-modified silicone 1 | | | | | Glass substrate | Commercially available snow deposition inhibition paint |
| | | Equivalence based on anionic groups* | | | 1.25 | | | | |
| Components** | A-2 | Compound for modification | 1.91 | 1.91 | 1.91 | 1.91 | 1.91 | | |
| | A-1 | TCNF(H-form) | 0.6 | 0.6 | 0.6 | 0.6 | 0.6 | | |
| | C | Silicone oil 1 SP value: 7.3 | — | — | — | 12 | — | | |
| | C | Silicone oil 3 SP value: 7.3 | 12 | 12 | 4 | — | — | | |

TABLE 5-continued

| | | Ex. 17 | Ex. 18 | Ex. 19 | Ex. 20 | Ex. 21 | Comp. Ex. 8 | Comp. Ex. 9 |
|---|---|---|---|---|---|---|---|---|
| C | Silicone oil 4 SP value: 7.3 | — | — | — | — | 12 | | |
| D | Polyether-modified silicone 1 | — | 0.2 | 0.2 | 0.2 | 0.2 | | |
| B | Water | Balance | | | | | | |
| A/C mass ratio | | 0.21 | 0.21 | 0.63 | 0.21 | 0.21 | | |
| Film thickness, μm | | 20 | 20 | 20 | 20 | 20 | — | 20 |
| Sliding angle (8 μL of water), ° | | 7 | 7 | 37 | 11 | 24 | 85 or more | 85 or more |
| Test for crushed ice slidability | | 4 | 5 | 3 | 5 | 3 | 1 | 2 |
| Evaluation test for snow slidability | | 4 | 5 | 2 | 3 | 2 | 1 | 1 |

*Equivalence based on anionic groups of the anionically modified cellulose fibers
**% by mass It could be seen from Table 5 that in the films obtained by drying an emulsion composition of the present invention, the water droplets were less likely to be detained, and ice and snow were more likely to slide down, as compared to the glass substrate itself (Comparative Example 8) or a commercially available snow deposition inhibition paint (Comparative Example 9). Therefore, it could be seen that the films obtained by drying the emulsion composition of the present invention exhibited excellent performances as antifouling films and snow deposition inhibition films. Surprisingly, the snow and ice were slid down even under the low temperature conditions of from 1° to 2° C., so that it can be seen that the snow deposition inhibition film of the present invention is highly useful.

INDUSTRIAL APPLICABILITY

Since the emulsion composition of the present invention is capable of forming a film having slippery properties, which can be utilized on various surfaces, for example, in the fields of coatings for ships and bridges, cosmetics, and the like.

The invention claimed is:

1. An emulsion composition comprising the following Components (A) to (C):
   (A) hydrophobically modified cellulose fibers in which carboxy group-containing cellulose fibers are bound at a carboxy group thereof to an amino-modified silicone via ionic bonding or amide bonding;
   (B) water; and
   (C) an organic compound that has a SP value of 10 or less, is liquid at 25° C. and 1 atm, and is selected from the group consisting of alcohols, ester oils, hydrocarbon oils, silicone oils, fats and oils, fluorine-containing inert liquids, and fatty acids.

2. The emulsion composition according to claim 1, wherein Component (C) is selected from the group consisting of silicone oils and ester oils.

3. The emulsion composition according to claim 1, wherein Component (C) comprises one or more members selected from the group consisting of ester oils, silicone oils, ether oils, fats and oils, and fluorine-containing inert liquids.

4. The emulsion composition according to claim 1, wherein a mass ratio of Component (A) to Component (C) (A/C) is 0.0001 or more and 20 or less.

5. The emulsion composition according to claim 1, further comprising:
   Component (D) a polyether-modified silicone compound.

6. The emulsion composition according to claim 1, wherein said organic compound has a SP value of 6.0-10.

7. The emulsion composition according to claim 1, wherein said organic compound has a SP value of 6.5-9.0.

8. The emulsion composition according to claim 1, wherein said organic compound has a SP value of 6.5-8.5.

9. The emulsion composition according to claim 1, wherein an average particle diameter of emulsion droplets in the emulsion composition is 10 nm or more and 2000 nm or less.

10. The emulsion composition according to claim 1, wherein an average particle diameter of emulsion droplets in the emulsion composition is 100 nm or more and 500 nm or less.

11. A method for producing a film, the method comprising:
   drying an emulsion composition as defined in claim 1.

12. A dried film obtained by drying an emulsion composition as defined in claim 1.

13. A coated film obtained by a process comprising:
   applying an emulsion composition as defined in claim 1, to obtain a coating; and
   drying the coating.

* * * * *